(12) United States Patent
Huang et al.

(10) Patent No.: US 9,609,143 B2
(45) Date of Patent: Mar. 28, 2017

(54) ENFORCING RADIO FREQUENCY USAGE BILLING AND CONTROL POLICIES

(71) Applicant: Verizon Patent and Licensing Inc., Arlington, VA (US)

(72) Inventors: Ye Huang, San Ramon, CA (US); Priscilla Lau, Fremont, CA (US); Raymond So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/827,656

(22) Filed: Aug. 17, 2015

(65) Prior Publication Data

US 2017/0054855 A1 Feb. 23, 2017

(51) Int. Cl.
*H04M 11/00* (2006.01)
*H04M 15/00* (2006.01)
*H04M 15/02* (2006.01)
*H04W 48/06* (2009.01)

(52) U.S. Cl.
CPC ......... *H04M 15/58* (2013.01); *H04M 15/886* (2013.01); *H04M 15/888* (2013.01); *H04W 48/06* (2013.01)

(58) Field of Classification Search
CPC ... H04L 41/0893; H04L 47/14; H04L 47/822; H04L 47/20; H04L 47/805; H04L 47/808; H04L 41/5051; H04L 43/08; H04L 47/12; H04L 47/801; H04L 47/824; H04L 63/10; H04L 41/5029; H04L 12/1407

See application file for complete search history.

(56) References Cited

U.S. PATENT DOCUMENTS

| | | | |
|---|---|---|---|
| 2009/0264097 A1* | 10/2009 | Cai | G06Q 30/04 455/406 |
| 2011/0294435 A1* | 12/2011 | Miller | H04L 41/0893 455/67.11 |
| 2011/0317557 A1* | 12/2011 | Siddam | H04W 28/16 370/232 |
| 2012/0324100 A1* | 12/2012 | Tomici | H04L 45/123 709/224 |

* cited by examiner

*Primary Examiner* — Nimesh Patel

(57) ABSTRACT

A method may include receiving information identifying a radio frequency (RF) usage policy that is associated with a user equipment (UE). The UE may communicate with a network using RF signals, and the RF access signaling usage policy may identify an RF access signaling usage threshold. The RF access signaling usage threshold may identify a quantity of bearers and an action to perform based on the UE requesting the quantity of bearers. The method may include causing a gateway device to monitor RF access signaling usage of the UE. The method may include receiving an RF access signaling usage update. The method may include determining that the RF access signaling usage satisfies the RF access signaling usage threshold based on the RF access signaling usage update. The method may include causing an action to be performed based on the RF access signaling usage policy.

20 Claims, 20 Drawing Sheets

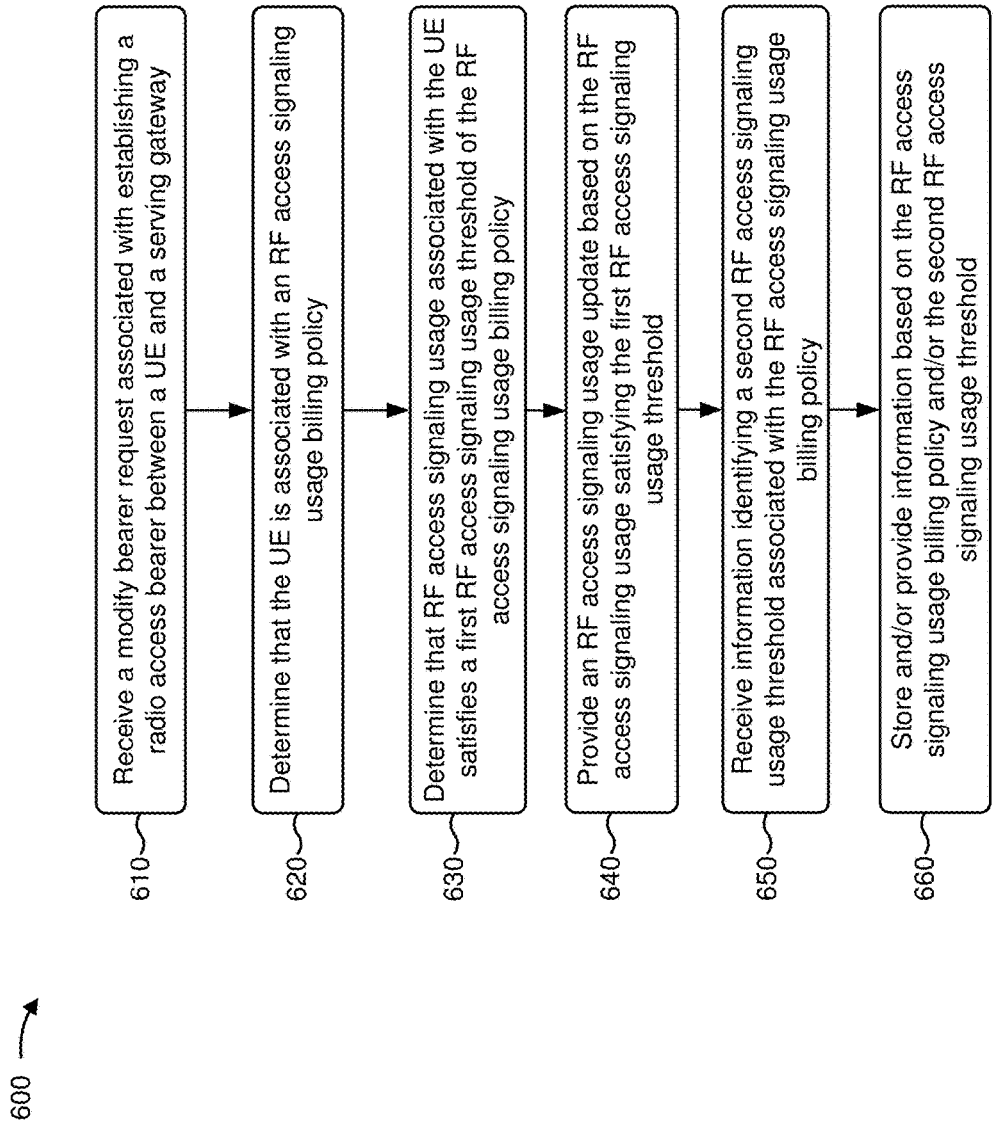

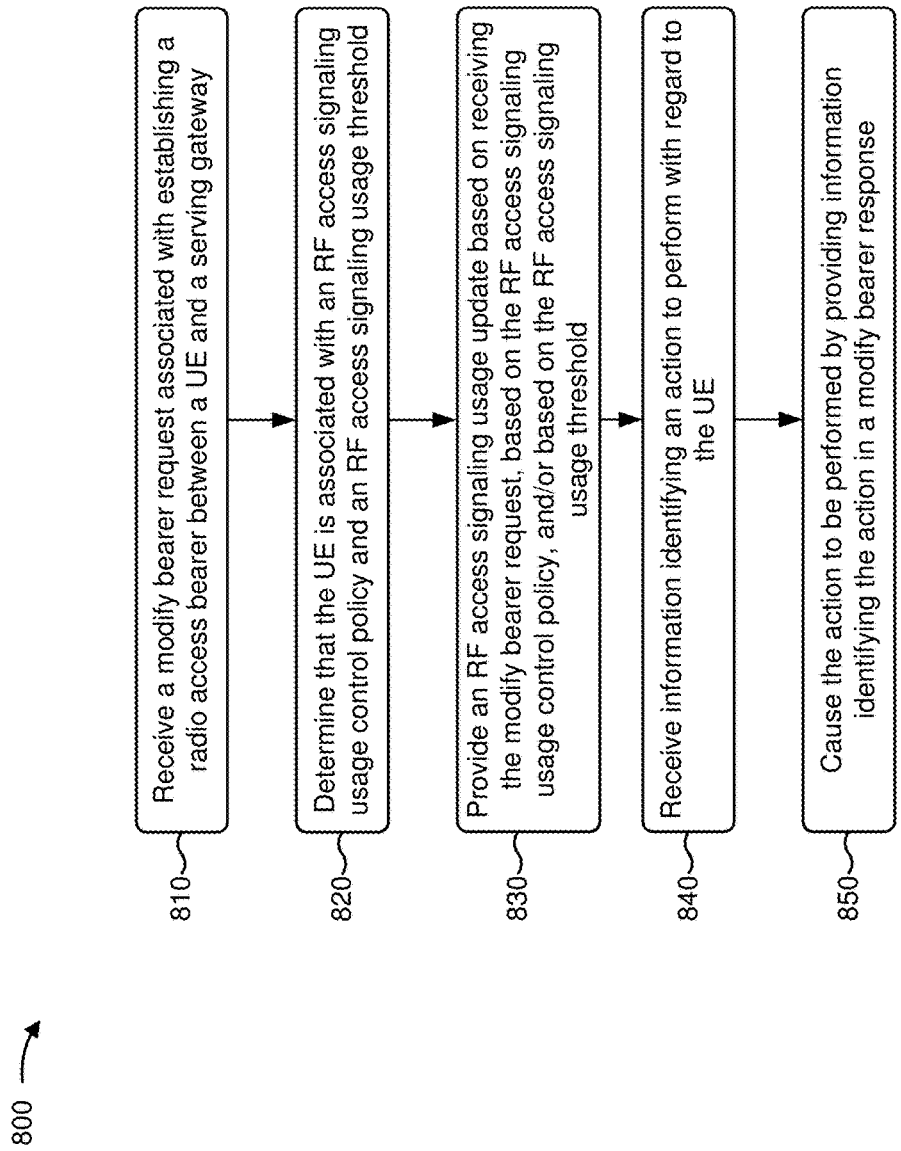

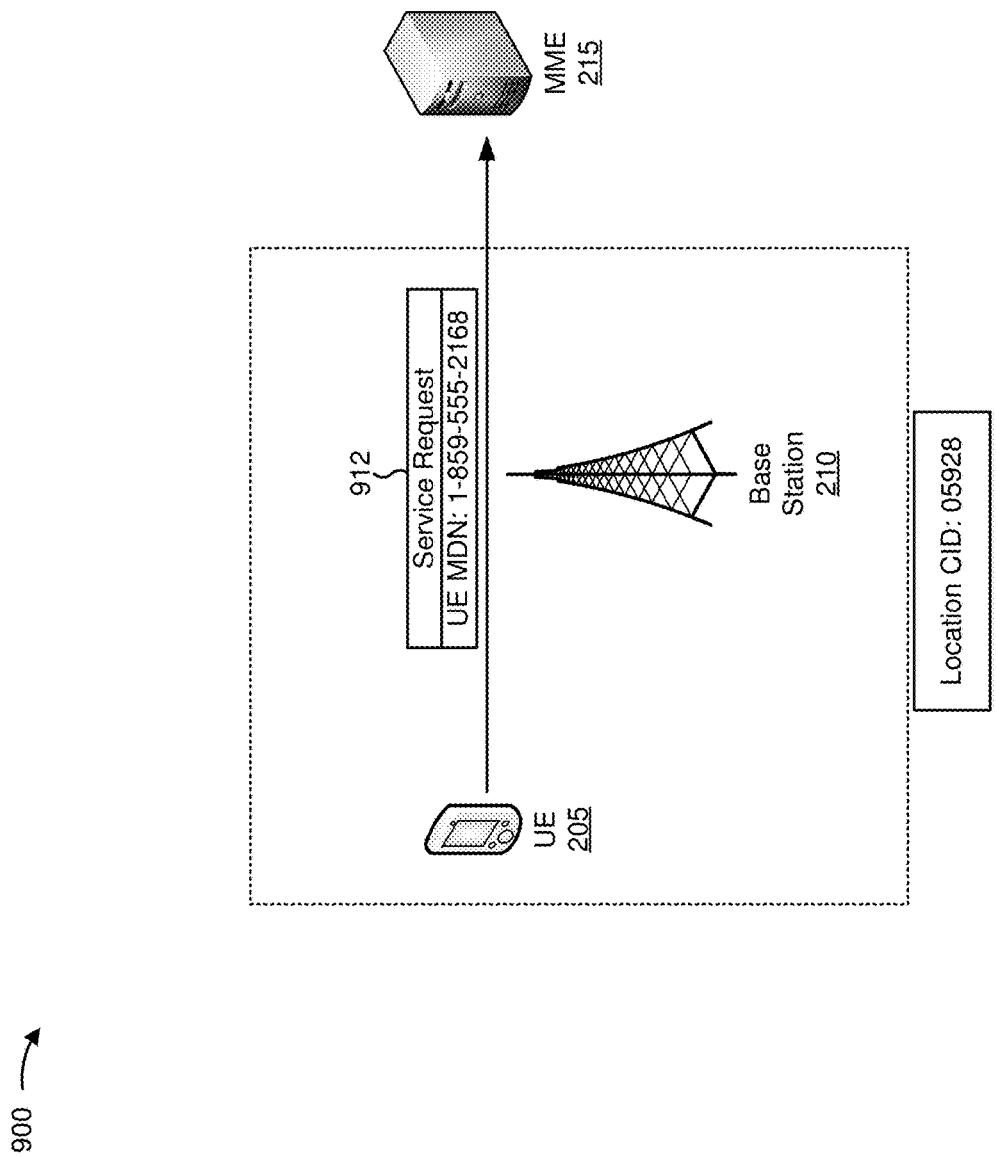

ENFORCING RADIO FREQUENCY USAGE BILLING AND CONTROL POLICIES

BACKGROUND

User equipment (a UE) may communicate with a base station to provide information to and/or receive information from devices of a network, such as an LTE network. The UE may communicate with the base station using radio frequency (RF) signals. Some UEs may generate more RF signals and/or may generate RF signals more frequently than other UEs.

BRIEF DESCRIPTION OF THE DRAWINGS

FIG. 6 is a flow chart of an example process for enforcing a radio frequency usage billing policy;

FIG. 8 is a flow chart of an example process for enforcing a radio frequency usage control policy; and FIGS. 9A-9F are diagrams of an example implementation relating to the example process shown in FIG. 8.

DETAILED DESCRIPTION OF PREFERRED EMBODIMENTS

The following detailed description of example implementations refers to the accompanying drawings. The same reference numbers in different drawings may identify the same or similar elements.

User equipment (UEs), of a cellular network (e.g., a long term evolution (LTE) network, a third generation (3G) network, etc.) may communicate with base stations of the cellular network using radio frequency (RF) signals. To communicate with the base stations, the UEs may cause radio access bearers to be established between the UEs, the base stations, and serving gateways of the network. Some UEs may transmit RF signals more frequently than other UEs, and therefore may request radio access bearers more frequently. For example, a machine type communication UE may cause radio access bearers to be established in order to transmit RF signals once an hour, once a minute, on a continuous basis, or the like. When multiple UEs, that transmit RF signals frequently, communicate with a particular base station and/or a particular portion of the network, the network may become congested.

Implementations described herein may enable a network device to specify and/or enforce RF access signaling usage policies, such as RF access signaling usage billing policies and/or RF access signaling usage control policies. Based on the RF access signaling usage policies, the network device may cause actions to be performed with regard to RF access signaling usage associated with a UE, such as billing a subscriber associated with the UE, blocking excessive RF access signaling usage by the UE, rerouting RF access signaling usage when a set of UEs is overloading a location with RF signals (e.g., by providing information via another connection, such as a satellite connection, a WiFi connection, etc.), or the like. By billing a subscriber according to RF access signaling usage, the network device may offset costs associated with the RF access signaling usage. By performing actions based on RF access signaling usage of a UE, the network device may improve efficiency of the network and/or reduce network congestion associated with RF signals.

Figure 1:
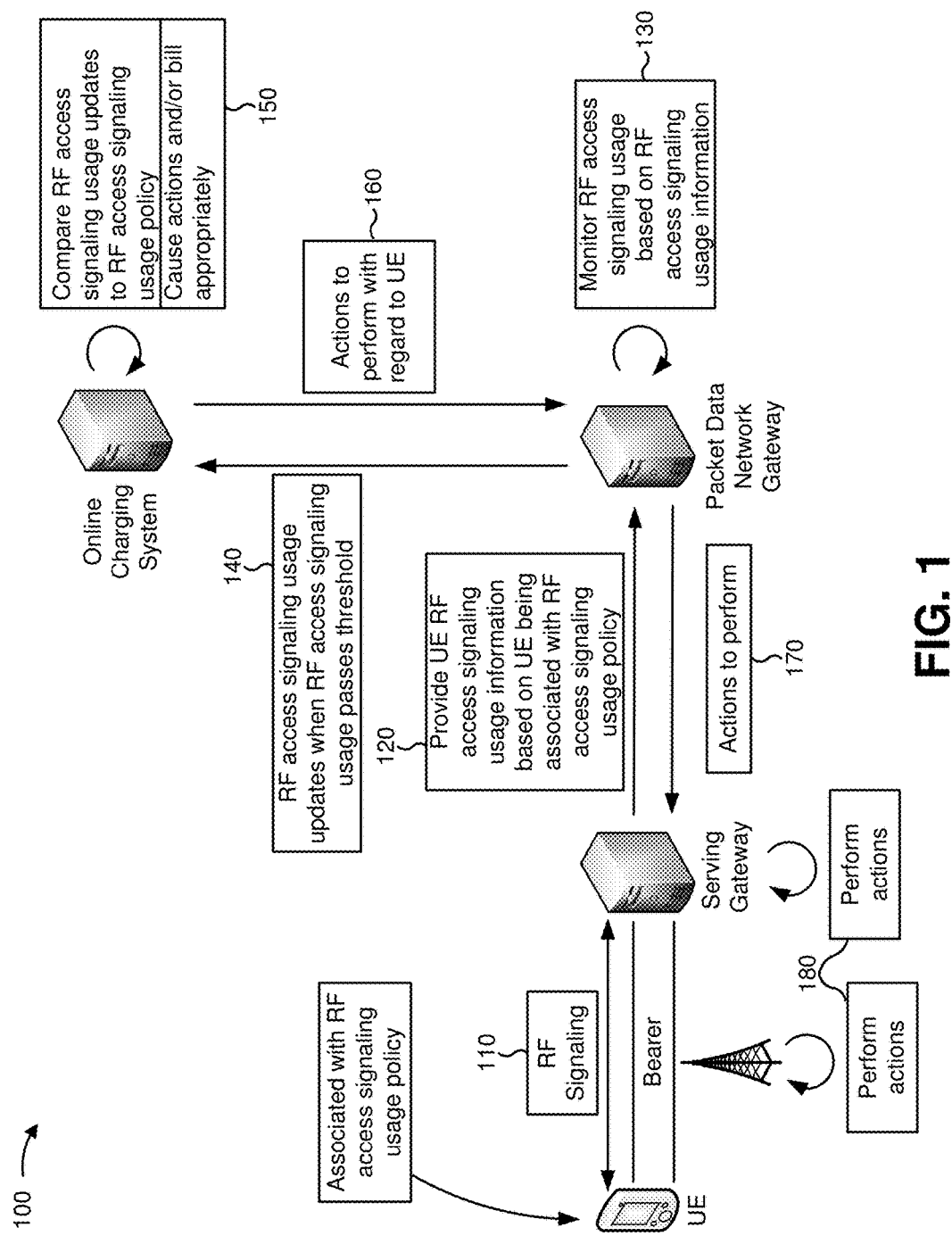
FIG. 1 is a diagram of an overview of an example implementation described herein.

FIG. 1 is a diagram of an overview of an example implementation 100 described herein. As shown in FIG. 1, a UE may be associated with an RF access signaling usage policy. The RF access signaling usage policy may specify actions to perform and/or billing information to provide based on RF access signaling usage of the UE. As shown by reference number 110, the UE may perform RF signaling with a serving gateway, via a base station and based on a bearer. As shown by reference number 120, the serving gateway may provide RF access signaling usage information, associated with the UE, to a packet data network gateway. As shown, the serving gateway may provide the RF access signaling usage information based on the UE being associated with the RF access signaling usage policy.

As shown by reference number 130, the packet data network gateway may monitor RF access signaling usage of the UE based on the RF access signaling usage information received from the serving gateway. As shown by reference number 140, the packet data network gateway may provide RF access signaling usage updates to an online charging system when the RF access signaling usage passes a threshold. The online charging system may store the RF access signaling usage policy, and may compare the RF access signaling usage updates to the RF access signaling usage policy. As shown by reference number 150, based on comparing the RF access signaling usage updates to the RF access signaling usage policy, the online charging system may cause an action to be performed, and/or may bill a party (e.g., a subscriber associated with the UE). As shown by reference number 160, the online charging system may provide information identifying actions to perform with regard to the UE 205 to the packet data network gateway.

As shown by reference number 170, the packet data network gateway may provide information identifying the actions to perform to the serving gateway. As shown by reference number 180, the serving gateway and/or the base station associated with the UE may perform the actions. The actions may include, for example, rerouting RF signals associated with the UE, dropping RF signals associated with the UE, changing a priority associated with RF signals of the UE, ending a bearer with the UE, or the like. In this way, the online charging system may monitor and/or enforce RF access signaling usage policies, which may offset costs associated with RF access signaling usage, reduce network resource consumption associated with RF access signaling usage, and/or improve network efficiency.

Figure 2:
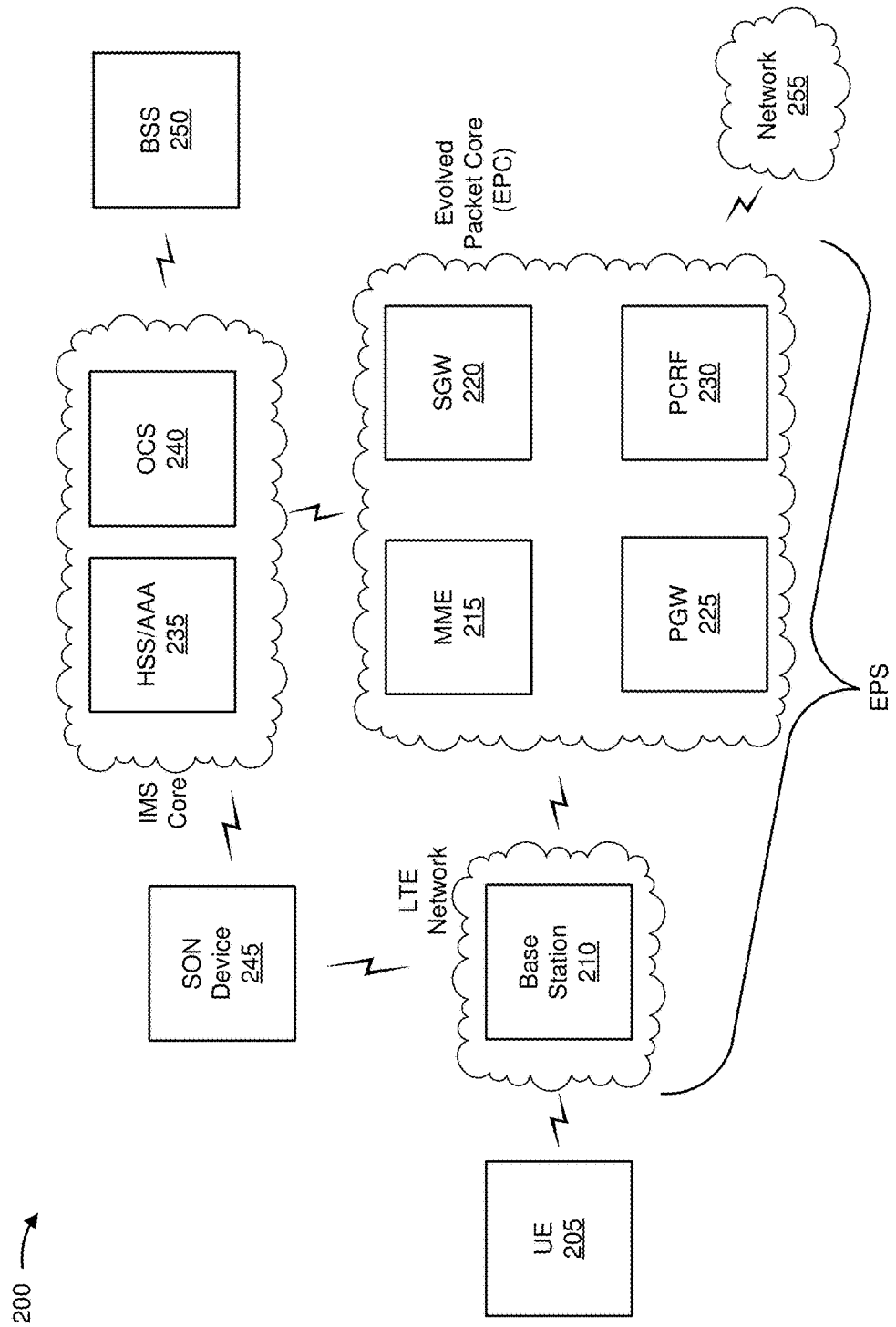
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment (UE) 205; a base station 210; a mobility management entity device (MME) 215; a serving gateway (SGW) 220; a packet data network gateway (PGW) 225; a policy charging and rules function (PCRF) 230; a home subscriber service/authentication, authorization, and accounting server (HSS/AAA) 235; an online charging system (OCS) 240; a self-organizing network (SON) device 245; a business support system (BSS) 250; and a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which UE 205 communicates with the EPC. The EPC may include MME 215, SGW 220, PGW 225, and/or PCRF 230 that enable UE 205 to communicate with network 255 and/or an Internet protocol (IP) multimedia subsystem (IMS) core. The IMS core may include HSS/AAA 235 and/or OCS 240, and may manage device registration and authentication, session initiation, etc., associated with UEs 205. HSS/AAA 235 and/or OCS 240 may reside in the EPC and/or the IMS core.

UE 205 may include one or more devices capable of communicating with base station 210 using radio frequency (RF) signals. For example, UE 205 may include a wireless communication device, a radiotelephone, a personal communications system (PCS) terminal (e.g., that may combine a cellular radiotelephone with data processing and data communications capabilities), a smart phone, a laptop computer, a tablet computer, a wireless sensor, a wireless measurement device, a remote control device, a smart grid device, and/or a similar device. UE 205 may send traffic to and/or receive traffic from network 255 via base station 210 (e.g., based on a radio access bearer between UE 205 and SGW 220). UE 205 may be associated with an RF access signaling usage policy (e.g., an RF access signaling usage billing policy and/or an RF access signaling usage control policy).

Base station 210 may include one or more devices capable of transferring traffic, such as audio, video, text, and/or other traffic, destined for and/or received from UE 205. In some implementations, base station 210 may include an eNB associated with the LTE network that receives traffic from and/or sends traffic to network 255 via SGW 220 and/or PGW 225. Additionally, or alternatively, one or more base stations 210 may be associated with a RAN that is not associated with an LTE network. Base station 210 may send traffic to and/or receive traffic from UE 205 via an air interface (e.g., an RF signal). In some implementations, base station 210 may include a small cell base station, such as a base station of a microcell, a picocell, and/or a femtocell. In some implementations, base station 210 may include SON device 245 (e.g., a distributed SON device).

MME 215 may include one or more devices, such as one or more server devices, capable of managing authentication, activation, deactivation, and/or mobility functions associated with UE 205. In some implementations, MME 215 may perform operations relating to authentication of UE 205. Additionally, or alternatively, MME 215 may facilitate the selection of a particular SGW 220 and/or a particular PGW 225 to serve traffic to and/or from UE 205. MME 215 may perform operations associated with handing off UE 205 from a first base station 210 to a second base station 210 when UE 205 is transitioning from a first cell associated with the first base station 210 to a second cell associated with the second base station 210. Additionally, or alternatively, MME 215 may select another MME (not pictured), to which UE 205 should be handed off (e.g., when UE 205 moves out of range of MME 215).

In some implementations, MME 215 may receive and/or store information indicating that UE 205 is associated with an RF access signaling usage billing policy and/or an RF access signaling usage control policy. MME 215 may receive a service request from UE 205, and may cause UE 205 to establish a radio access bearer with SGW 220 via base station 210 based on the service request. MME 215 may perform actions based on an RF access signaling usage control policy (e.g., rerouting RF signals, delaying and/or dropping RF signals, assigning a particular priority to an RF signal, etc.) based on information received from PGW 225 or another device (e.g., OCS 240, etc.).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and transfers traffic. In some implementations, SGW 220 may aggregate traffic received from one or more base stations 210 associated with the LTE network, and may send the aggregated traffic to network 255 (e.g., via PGW 225) and/or other network devices associated with the EPC and/or the IMS core. SGW 220 may also receive traffic from network 255 and/or other network devices, and may send the received traffic to UE 205 via base station 210. Additionally, or alternatively, SGW 220 may perform operations associated with handing off UE 205 to and/or from an LTE network. SGW 220 may provide communications to and/or receive communications from PGW 225 (e.g., modify bearer requests based on RF access signaling usage, modify bearer responses based on RF access signaling usage, etc.) in a situation where UE 205 is associated with an RF access signaling usage billing policy and/or an RF access signaling usage control policy.

PGW 225 may include one or more devices capable of providing connectivity for UE 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to UE 205 via SGW 220 and base station 210. PGW 225 may record data usage information (e.g., byte usage), and may provide the data usage information to HSS/AAA 235. PGW 225 may receive modify bearer requests from SGW 220, may determine RF access signaling usage of UE 205 based on the modify bearer requests, and may provide RF access signaling usage updates to OCS 240 based on the RF access signaling usage of UE 205. PGW 225 may receive information identifying rules (e.g., RF access signaling usage thresholds, etc.) from PCRF 230, and may provide RF access signaling usage updates to OCS 240 based on the rules.

PCRF 230 may include one or more network devices, or other types of communication devices. PCRF 230 may store subscriber information, such as voice call and data rate plans or quotas for subscribers. PCRF 230 may provide network control regarding service data flow detection, gating, QoS, and/or flow-based charging. Policies and rules regarding QoS may include policies and rules instructing UE 205 and/or network elements (base station 210, MME 215, SGW 220, PGW 225, etc.) to minimize packet loss, to implement a packet delay budget, to provide a guaranteed bit rate (GBR), to provide a particular latency, to reduce RF signal congestion, and/or to perform other activities associated with QoS. PCRF 230 may provide policies and rules to other network devices, such as base station 210, SGW 220, PGW 225, or the like, to implement network control. PCRF 230 may determine how a certain service data flow shall be treated, and may ensure that user plane traffic mapping and QoS is in accordance with a user's profile and/or network policies. PCRF 230 may receive information from OCS 240 (e.g., information relating to an RF access signaling usage policy, etc.), and may determine a rule to provide to PGW 225 based on the information (e.g., a rule to provide an RF access signaling usage update based on a particular RF access signaling usage threshold, etc.).

HSS/AAA 235 may include one or more devices, such as one or more server devices, capable of managing (e.g., receiving, generating, storing, processing, and/or providing) information associated with UE 205. For example, HSS/AAA 235 may manage subscription information associated with UE 205, such as information that identifies a subscriber profile of a user associated with UE 205, information that identifies services and/or applications that are accessible to UE 205, location information associated with UE 205, a network identifier (e.g., a network address) that identifies UE 205, information that identifies a treatment of UE 205 (e.g., quality of service information, a quantity of minutes allowed per time period, a quantity of data consumption allowed per time period, etc.), information that identifies whether UE 205 is associated with an RF access signaling usage control policy and/or an RF access signaling usage billing policy, and/or similar information. HSS/AAA 235 may provide this information to one or more other devices of environment 200 to support the operations performed by those devices.

HSS/AAA 235 may perform authentication operations for UE 205 and/or a user of UE 205 (e.g., using one or more credentials), may control access, by UE 205, to a service and/or an application (e.g., based on one or more restrictions, such as time-of-day restrictions, location restrictions, single or multiple access restrictions, read/write restrictions, RF access signaling usage restrictions, etc.), may track resources consumed by UE 205 (e.g., a quantity of voice minutes consumed, a quantity of data consumed, a quantity of RF signals transmitted, a quantity of radio access bearers requested and/or established, etc.), and/or may perform similar operations.

OCS 240 may include one or more devices, such as one or more server devices, that perform real-time (e.g., continuous) billing operations based on service usage. OCS 240 may receive information identifying an RF access signaling usage billing policy and/or an RF access signaling usage control policy. OCS 240 may determine whether RF access signaling usage of UE 205 satisfies one or more RF access signaling usage thresholds associated with the RF access signaling usage billing policy and/or the RF access signaling usage control policy. OCS 240 may cause PCRF 230 to provide the one or more RF access signaling usage thresholds to PGW 225. When UE 205 satisfies one or more of the thresholds, OCS 240 may provide billing information, information identifying other RF access signaling usage thresholds, or other information, to one or more devices (e.g., UE 205, PCRF 230, HSS/AAA 235, etc.). OCS 240 may receive an overload notification indicating that a location is associated with a particular level of RF access signaling usage (e.g., from SON device 245, etc.), and may determine one or more actions to perform based on the overload notification.

SON device 245 may include one or more devices, such as one or more server devices, capable of receiving, storing, processing, and/or providing information related to performance of the LTE network. SON device 245 may determine that a location is associated with a particular volume of RF signal traffic and/or radio access bearers (e.g., a volume greater than an intended volume, a volume that is relatively larger than a volume associated with another location, etc.). SON device 245 may provide an overload notification to OCS 240 indicating that the location is associated with the particular volume. In some implementations, SON device 245 may include a centralized SON, and may be implemented in a network device (e.g., PGW 225, OCS 240, a network administrator device, etc.). Additionally, or alternatively, SON device 245 may include one or more distributed SONs, which may be associated with (e.g., included in) a set of base stations 210 and/or MMEs 215.

BSS 250 may include one or more devices capable of receiving, storing, processing, and/or providing information related to RF access signaling usage billing policies and/or RF access signaling usage control policies. For example, BSS 250 may include a laptop computer, a tablet computer, a desktop computer, a server, or a similar device. BSS 250 may receive and/or determine an RF access signaling usage billing policy and/or an RF access signaling usage control policy, and may provide information related to the RF access signaling usage billing policy and/or the RF access signaling usage control policy to another device (e.g., HSS/AAA 235, OCS 240, etc.).

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
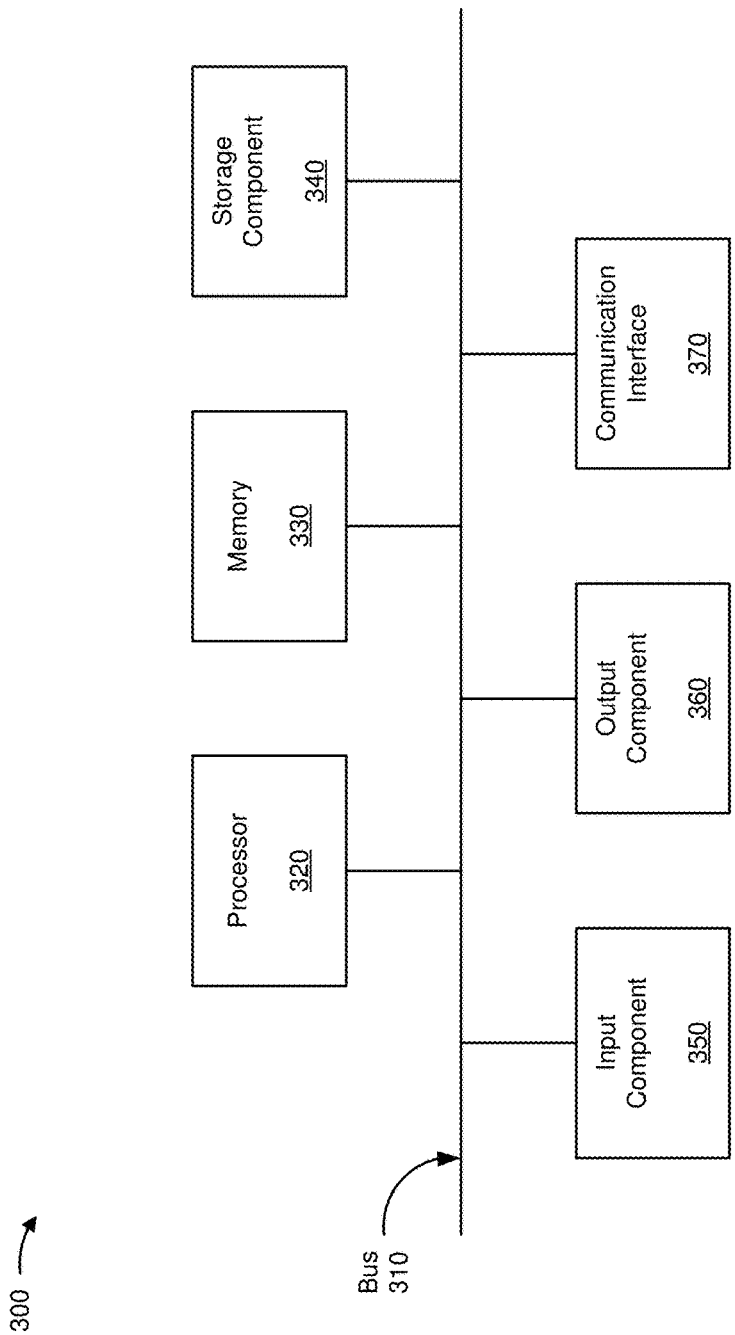
FIG. 3 is a diagram of example components of one or more devices of FIG. 2.

FIG. 3 is a diagram of example components of a device 300. Device 300 may correspond to UE 205, base station 210, MME 215, SGW 220, PGW 225, PCRF 230, HSS/AAA 235, OCS 240, SON device 245 and/or BSS 250. In some implementations, UE 205, base station 210, MME 215, SGW 220, PGW 225, PCRF 230, HSS/AAA 235, OCS 240, SON device 245, and/or BSS 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
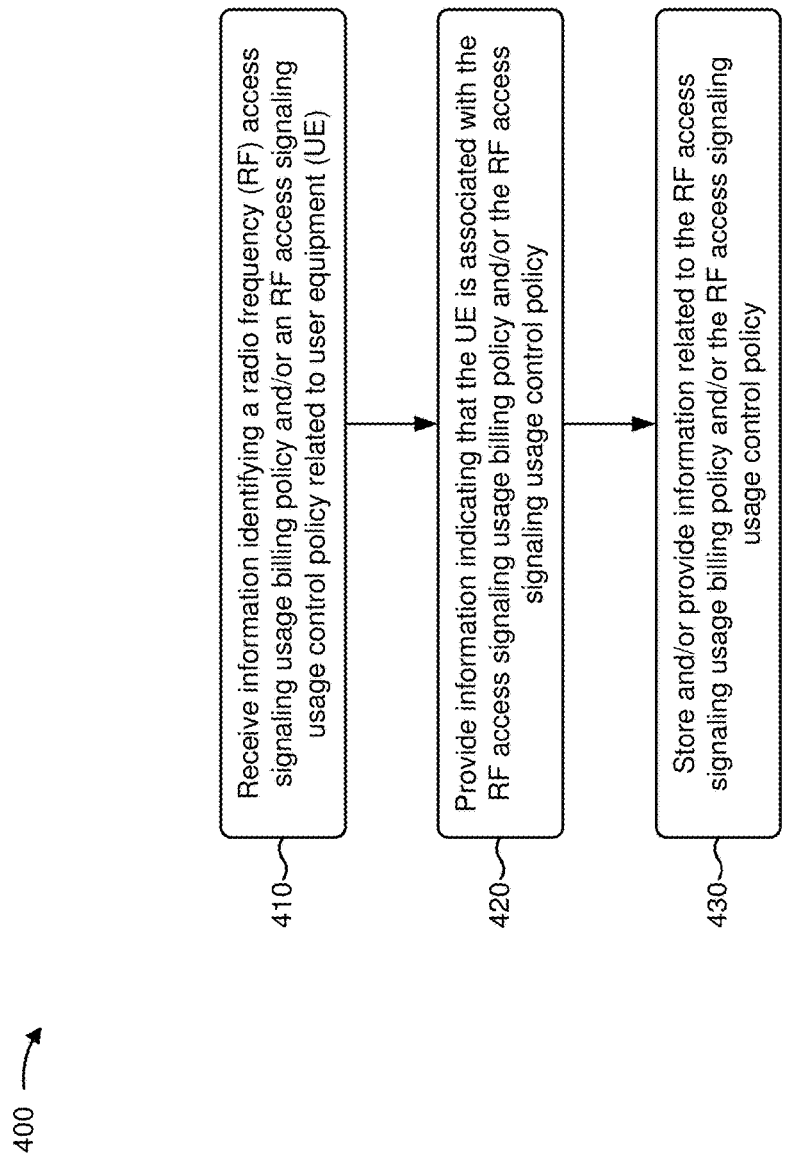
FIG. 4 is a flow chart of an example process for configuring devices based on a radio frequency usage billing policy and/or a radio frequency usage control policy.

FIG. 4 is a flow chart of an example process 400 for configuring devices based on a radio frequency usage billing policy and/or a radio frequency usage control policy. In some implementations, one or more process blocks of FIG. 4 may be performed by OCS 240. In some implementations, one or more process blocks of FIG. 4 may be performed by another device or a group of devices separate from or including OCS 240, such as UE 205, base station 210, MME 215, SGW 220, PGW 225, PCRF 230, HSS/AAA 235, SON device 245, and/or BSS 250.

As shown in FIG. 4, process 400 may include receiving information identifying a radio frequency (RF) usage billing policy and/or an RF access signaling usage control policy related to user equipment (UE) (block 410). For example, OCS 240 may receive information identifying an RF access signaling usage billing policy and/or an RF access signaling usage control policy related to UE 205. In some implementations, OCS 240 may receive the information from BSS 250. For example, a network administrator may input the RF access signaling usage billing policy and/or the RF access signaling usage control policy to BSS 250, and may identify one or more UEs 205 to which the RF access signaling usage billing policy and/or the RF access signaling usage control policy may apply. BSS 250 may provide the RF access signaling usage billing policy and/or the RF access signaling usage control policy, and the identity of the one or more UEs 205, to OCS 240.

UE 205 may provide RF signals to and/or receive RF signals from base station 210 and/or SGW 220 based on a radio access bearer. For example, when UE 205 determines to provide an RF signal to base station 210, UE 205 may provide a service request for a radio access bearer to provide the RF signal. The radio access bearer may include a dedicated radio bearer, based on which UE 205 may communicate information with base station 210 using RF signals, and an S1u bearer, based on which base station 210 may communicate the information with SGW 220. Some UEs 205 may use a relatively large amount of RF signals (e.g., relatively large compared to other UEs 205). BSS 250 may associate such UEs 205 with RF access signaling usage billing policies and/or RF access signaling usage control policies, to offset costs and/or network congestion related to the relatively large amount of RF signals.

An RF access signaling usage billing policy may identify one or more RF access signaling usage thresholds and may associate one or more billing rates with the one or more RF access signaling usage thresholds, based on which a subscriber may be charged a monetary amount. For example, when UE 205 provides a service request for a radio access bearer between zero times per hour and five times per hour, a subscriber associated with UE 205 may be charged at a first billing rate. When UE 205 provides a service request between six times per hour and fifty times per hour, the subscriber may be charged at a second billing rate. When UE 205 provides a service request for an always-on radio access bearer (e.g., a radio access bearer that remains in place for longer than a threshold period of time, such as 1 hour, 1 day, 1 week, etc.), the subscriber may be charged at a third billing rate. The above example of an RF access signaling usage billing policy is one possible example, and other examples of RF access signaling usage billing policies, with other thresholds and/or billing rates, are possible.

In some implementations, an RF access signaling usage billing policy may be associated with a particular UE 205. Additionally, or alternatively, an RF access signaling usage billing policy may be associated with multiple UEs 205. For example, an RF access signaling usage billing policy may be associated with a subscriber that is associated with multiple UEs 205, may be associated with a particular type of UE 205, may be associated with a particular location that includes multiple UEs 205, or the like.

An RF access signaling usage control policy may identify an RF access signaling usage threshold, and a control action to perform based on UE 205 satisfying the threshold. For example, the RF access signaling usage policy may permit UE 205 to establish up to five radio access bearers per hour, and may cause MME 215, or the like, to deny service requests received after the fifth radio access bearer is established.

In some implementations, the RF access signaling usage control policy may relate to RF access signaling usage by multiple UEs 205. For example, assume that a particular location is associated with relatively high RF access signaling usage (e.g., relatively high as compared to relatively low RF access signaling usage, based on a particular quantity of radio access bearers established, a particular quantity of RF signals received by base station 210 per hour, etc.). In such a case, SON device 245 may determine that the particular location is associated with relatively high RF access signaling usage, and may transmit an overload notification indicating that the particular location is associated with relatively high RF access signaling usage. The overload notification may identify the particular location (e.g., based on a GSM Cell ID (CID), a Location area code (LAC), etc.), a severity of an overload (e.g., by comparing a designed RF capacity of the particular location to a current RF capacity of the particular location, by identifying a quantity of radio access bearers and/or RF signals associated with the particular location, etc.), or the like.

An RF access signaling usage control policy may indicate one or more actions to perform when the particular location is associated with the relatively high RF access signaling usage. For example, MME 215, or another device, may limit a quantity of radio access bearers permitted to UEs 205 in the particular location, may cause subscribers of UEs 205 to be charged additional money for transmitting RF signals in the particular location, may reroute information to be provided by UEs 205 (e.g., by providing the information via another connection, such as a satellite connection, a WiFi connection, etc.), may provide a notification to UE 205, a subscriber, and/or a network entity, or the like. In this way, MME 215 may control RF access signaling usage in areas associated with relatively high RF access signaling usage, which may reduce network congestion and/or improve network performance in such areas.

In some implementations, OCS 240 and/or BSS 250 may determine RF access signaling usage control policies. For example, OCS 240 and/or BSS 250 may determine locations associated with relatively high RF access signaling usage (e.g., based on information received from SON device 245, etc.), and may generate RF access signaling usage control policies for UEs 205 associated with the locations. For example, OCS 240 and/or BSS 250 may generate an RF access signaling usage control policy that causes MME 215 to reroute information when a location is associated with an RF access signaling usage above a threshold quantity (e.g., by providing the information via another connection, such as a satellite connection, a WiFi connection, etc.). In this way, OCS 240 and/or BSS 250 may automatically determine RF access signaling usage policies for high-RF access signaling usage areas, which may improve responsiveness in reacting to the high-RF access signaling usage areas, as compared to receiving the RF access signaling usage policies via user input.

As further shown in FIG. 4, process 400 may include providing information indicating that the UE is associated with the RF access signaling usage billing policy and/or the RF access signaling usage control policy (block 420). For example, OCS 240 may provide information indicating that UE 205 is associated with the RF access signaling usage billing policy and/or the RF access signaling usage control policy. In some implementations, OCS 240 may provide the information to HSS/AAA 235, and HSS/AAA 235 may store information associating UE 205 and the RF access signaling usage billing policy and/or the RF access signaling usage control policy (e.g., may set a flag in a profile associated with UE 205 and/or a subscriber associate with UE 205, etc.).

In some implementations, OCS 240 may provide the information to UE 205. For example, OCS 240 may provide information to UE 205 indicating that UE 205 is associated with the RF access signaling usage billing policy and/or the RF access signaling usage control policy. When UE 205 provides a service request to MME 215, UE 205 may provide information indicating that UE 205 is associated with the RF access signaling usage billing policy and/or the RF access signaling usage control policy. In this way, UE 205 may conserve resources of MME 215 that may otherwise be used to determine that UE 205 is associated with the RF access signaling usage billing policy and/or the RF access signaling usage control policy.

Additionally, or alternatively, OCS 240 may provide the information to MME 215, and MME 215 may store the information. When MME 215 receives a service request from UE 205, MME 215 may determine that UE 205 is associated with the RF access signaling usage billing policy and/or the RF access signaling usage control policy based on the stored information, and may provide information indicating that UE 205 is associated with the RF access signaling usage billing policy and/or the RF access signaling usage control policy to another device (e.g., SGW 220, PGW 225, etc.). In this way, MME 215 may reduce time and/or resource consumption required by the other device to determine that UE 205 is associated with the RF access signaling usage billing policy and/or the RF access signaling usage control policy.

As further shown in FIG. 4, process 400 may include storing and/or providing information related to the RF access signaling usage billing policy and/or the RF access signaling usage control policy (block 430). For example, OCS 240 may store the RF access signaling usage billing policy and/or the RF access signaling usage control policy. In a situation where OCS 240 receives an RF access signaling usage update for UE 205, OCS 240 may compare the RF access signaling usage to the stored RF access signaling usage billing policy and/or the RF access signaling usage control policy to determine whether to charge a subscriber and/or perform an action with regard to UE 205.

In some implementations, OCS 240 may provide information related to the RF access signaling usage billing policy and/or the RF access signaling usage control policy. For example, OCS 240 may determine one or more RF access signaling usage thresholds of the RF access signaling usage billing policy and/or the RF access signaling usage control policy. OCS 240 may provide information identifying the one or more RF access signaling usage thresholds to PCRF 230. In some implementations, PCRF 230 may provide a rule based on the one or more RF access signaling usage thresholds to another device (e.g., PGW 225, etc.), and may cause the other device to provide an RF access signaling usage update based on the rule. In this way, OCS 240 may cause another device to provide an RF access signaling usage update when an RF access signaling usage threshold is satisfied, which may aid OCS 240 in enforcing the RF access signaling usage billing policy and/or the RF access signaling usage control policy.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
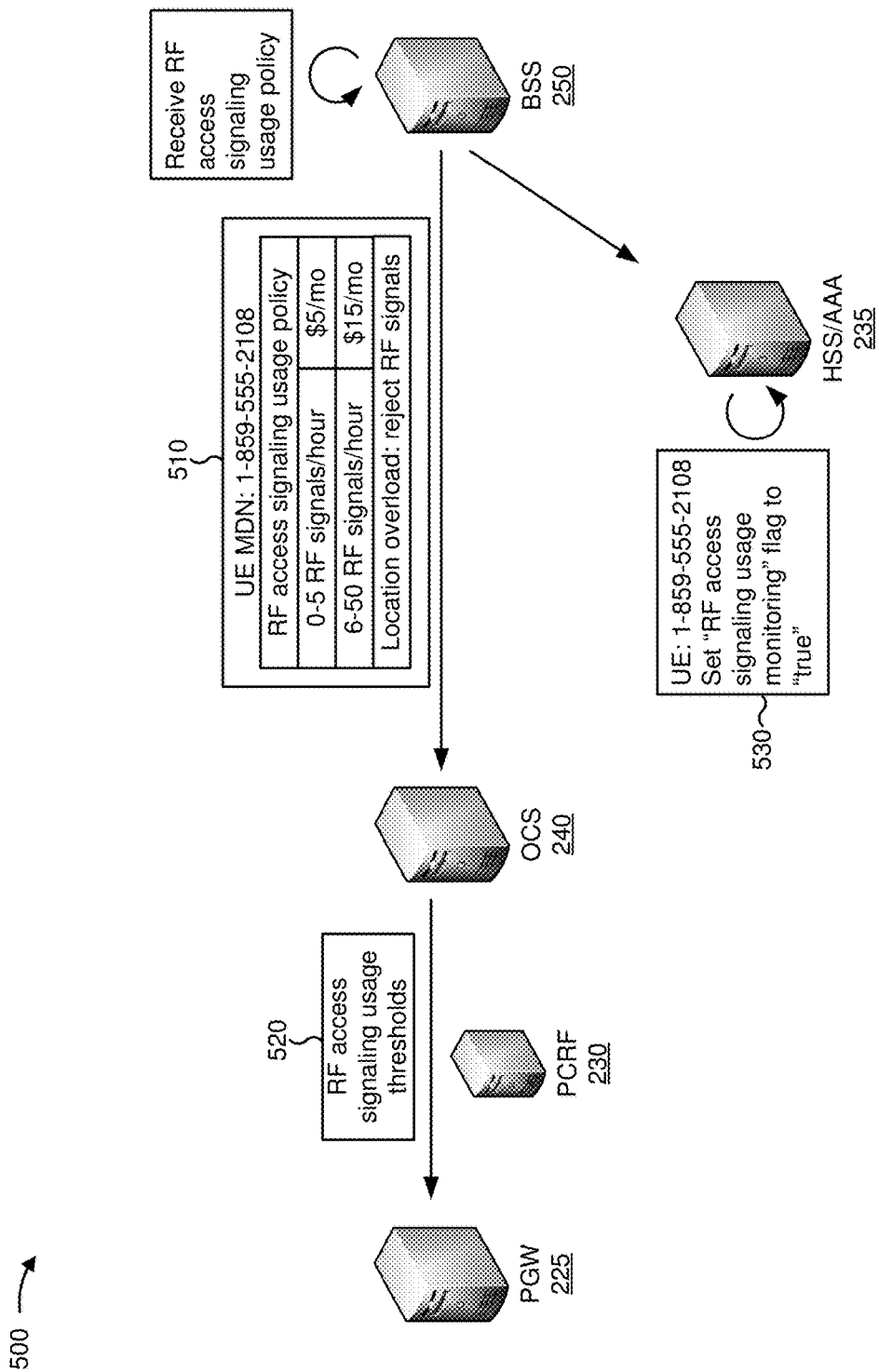
FIG. 5 is a diagram of an example implementation relating to the example process shown in FIG. 4.

FIG. 5 is a diagram of an example implementation 500 relating to example process 400 shown in FIG. 4. FIG. 5 shows an example of configuring devices based on a radio frequency usage billing policy and/or a radio frequency usage control policy.

As shown in FIG. 5, BSS 250 may receive an RF access signaling usage policy. Assume that the RF access signaling usage policy includes an RF access signaling usage billing policy and an RF access signaling usage control policy. Assume further that BSS 250 receives the RF access signaling usage policy based on an input from a network administrator. As shown by reference number 510, the RF access signaling usage policy may include information identifying UE 205 (e.g., an MDN of 1-859-555-2108). As further shown, the RF access signaling usage policy may identify RF access signaling usage thresholds. Here, the RF access signaling usage billing policy includes RF access signaling usage thresholds of 0-5 RF signals per hour, corresponding to a first billing rate of $5 per month, and 6-50 RF signals per hour, corresponding to a second billing rate of fifteen dollars per month.

As shown, an RF access signaling usage control policy of the RF access signaling usage policy may include a threshold related to an overload location. Here, when OCS 240 receives an overload notification indicating that a location is associated with a particular quantity of RF signals and/or radio access bearers, the RF access signaling usage control policy specifies to reject RF signals associated with UE 205.

As shown, BSS 250 may provide the RF access signaling usage policy to OCS 240. Assume that OCS 240 stores the RF access signaling usage policy. As shown by reference number 520, OCS 240 may provide information identifying the RF access signaling usage thresholds to PGW 225. In some implementations, OCS 240 may provide information identifying the RF access signaling usage thresholds to PCRF 230, and PCRF 230 may determine rules, based on the RF access signaling usage thresholds, to provide to PGW 225. The rules may cause PGW 225 to provide RF access signaling usage updates when RF access signaling usage of UE 205 satisfies one or more of the RF access signaling usage thresholds.

As shown by reference number 530, BSS 250 may cause HSS/AAA 235 to modify a profile associated with UE 205. Here, HSS/AAA 235 sets an "RF access signaling usage monitoring" flag to a value of "true." The RF access signaling usage monitoring flag may indicate that UE 205 is subject to RF access signaling usage monitoring.

As indicated above, FIG. 5 is provided merely as an example. Other examples are possible and may differ from what was described with regard to FIG. 5.

FIG. 6 is a flow chart of an example process 600 for enforcing a radio frequency usage billing policy. In some implementations, one or more process blocks of FIG. 6 may be performed by PGW 225. In some implementations, one or more process blocks of FIG. 6 may be performed by another device or a group of devices separate from or including PGW 225, such as UE 205, base station 210, MME 215, SGW 220, PCRF 230, HSS/AAA 235, OCS 240, SON device 245, and/or BSS 250.

As shown in FIG. 6, process 600 may include receiving a modify bearer request associated with establishing a radio access bearer between a UE and a serving gateway (block 610). For example, PGW 225 may receive a modify bearer request. The modify bearer request may be associated with establishing a radio access bearer between UE 205 and SGW 220. In some implementations, PGW 225 may receive the modify bearer request from SGW 220. For example, SGW 220 may provide the modify bearer request based on UE 205 being associated with an RF access signaling usage billing policy and/or an RF access signaling usage control policy. The modify bearer request may include, for example, information identifying a radio access bearer, information identifying UE 205 (e.g., a Mobile Directory Number (MDN), an International Mobile Station Equipment Identity (IMEI), an international mobile subscriber identity (IMSI), an Internet Protocol (IP) address, etc.), information identifying a location associated with UE 205 and/or base station 210 (e.g., a CID, a LAC, etc.), or the like.

In some implementations, UE 205 may provide a service request to base station 210 to establish the radio access bearer. For example, UE 205 may determine to provide an RF signal to base station 210, and may transmit the service request to base station 210 to establish a radio bearer via which to provide the RF signal to base station 210. Base station 210 may provide the service request to MME 215. In some implementations, MME 215 may establish the radio access bearer between UE 205 and SGW 220 based on the service request. For example, MME 215 may cause a radio resource control (RRC) protocol connection and/or a radio bearer to be established between UE 205 and base station 210, and may cause an upload S1u bearer to be established between base station 210 and SGW 220.

Based on establishing the upload S1u bearer between base station 210 and SGW 220, MME 215 may provide a modify bearer request to SGW 220. Based on the modify bearer request, SGW 220 may reconfigure the upload S1u bearer as an upload/download S1u bearer. In this way, UE 205 may cause MME 215 and/or SGW 220 to configure a radio access bearer, which may permit UE 205 to communicate with the LTE network via base station 210 using RF signals.

In some implementations, SGW 220 may provide the modify bearer request to PGW 225. For example, MME 215 may determine that UE 205 is associated with an RF access signaling usage billing policy and/or an RF access signaling usage control policy. Based on UE 205 being associated with the RF access signaling usage billing policy and/or the RF access signaling usage control policy, MME 215 may cause SGW 220 to provide the modify bearer request to PGW 225.

As further shown in FIG. 6, process 600 may include determining that the UE is associated with an RF access signaling usage billing policy (block 620). For example, PGW 225 may determine that UE 205 is associated with an RF access signaling usage billing policy. In some implementations, PGW 225 may determine that UE 205 is associated with the RF access signaling usage billing policy based on locally stored information (e.g., information provided by another device, such as MME 215, PCRF 230, HSS/AAA 235, OCS 240, etc.). Additionally, or alternatively, PGW 225 may obtain information indicating that UE 205 is associated with the RF access signaling usage billing policy from another device, such as MME 215, PCRF 230, HSS/AAA 235, OCS 240, or the like. For example, PGW 225 may request the information indicating that UE 205 is associated with the RF access signaling usage billing policy, and may receive the information based on the request.

In some implementations, PGW 225 may determine that UE 205 is associated with the RF access signaling usage billing policy based on the modify bearer request. For example, the modify bearer request may include information related to monitoring RF access signaling usage of UE 205, and PGW 225 may determine that UE 205 is associated with the RF access signaling usage billing policy based on the information. Additionally, or alternatively, the modify bearer request may include information indicating that UE 205 is associated with the RF access signaling usage billing policy. For example, SGW 220 may transmit a flag, a bit, or the like, that identifies UE 205 as being associated with the RF access signaling usage billing policy.

As further shown in FIG. 6, process 600 may include determining that RF access signaling usage associated with the UE satisfies a first RF access signaling usage threshold of the RF access signaling usage billing policy (block 630). For example, PGW 225 may determine that RF access signaling usage, associated with UE 205, satisfies a first RF access signaling usage threshold of the RF access signaling usage billing policy. In some implementations, PGW 225 may determine that the RF access signaling usage satisfies the first RF access signaling usage threshold by comparing the RF access signaling usage to locally stored information. For example, PGW 225 may receive information identifying the first RF access signaling usage threshold (e.g., from PCRF 230, etc.) and may compare a quantity of modify bearer requests, from UE 205, to the first RF access signaling usage threshold.

In some implementations, PGW 225 may monitor RF access signaling usage of UE 205 based on a modify bearer request. For example, PGW 225 may identify a quantity of modify bearer requests received in a particular period of time, may determine that a received modify bearer request relates to an always-on radio access bearer, or the like, and may store monitoring information and/or provide RF access signaling usage updates accordingly.

In some implementations, UE 205 may provide RF signals to base station 210 at a particular interval (e.g., once per minute, five times per hour, twenty-five times per hour, once per day, etc.). For example, UE 205 may include a machine to machine (M2M) device, such as a sensor, or the like, which may provide information to base station 210 at the particular interval. In such implementations, UE 205 may establish a new radio access bearer with base station 210 and/or SGW 220 to provide RF signals at each of the intervals, which may consume network resources and/or cause network congestion.

Additionally, or alternatively, UE 205 may provide RF signals to base station 210 continuously. For example, UE 205 may establish a radio access bearer, and may maintain the radio access bearer for the duration in which UE 205 provides RF signals, which may lead to network congestion. To alleviate the network congestion and/or to offset the cost of the network resources associated with RF access signaling usage of UE 205, a network administrator may apply an RF access signaling usage billing policy to UE 205, as described in more detail below. In some implementations, the network administrator may apply an RF access signaling usage control policy to UE 205, as described in more detail in connection with FIG. 8, below.

In some implementations, PGW 225 may receive multiple modify bearer requests from SGW 220, and may determine that the RF access signaling usage satisfies the first RF access signaling usage threshold based on the multiple modify bearer requests. For example, assume that the RF access signaling usage billing policy indicates that an RF access signaling usage update is to be provided when UE 205 requests six radio access bearers in a period of one hour (i.e., satisfies a first RF access signaling usage threshold). Assume further that PGW 225 receives six modify bearer requests, associated with UE 205, in a period of one hour. In that case, PGW 225 may determine that the modify bearer requests satisfy the first RF access signaling usage threshold, and may provide an RF access signaling usage update, as described in more detail below.

As further shown in FIG. 6, process 600 may include providing an RF access signaling usage update based on the RF access signaling usage satisfying the first RF access signaling usage threshold (block 640). For example, PGW 225 may provide an RF access signaling usage update based on the RF access signaling usage of UE 205 satisfying the first RF access signaling usage threshold. The RF access signaling usage update may include information related to RF access signaling usage of UE 205. For example, the RF access signaling usage update may identify a location of UE 205, a device identifier of UE 205, a quantity and/or duration of RF signals and/or radio access bearers associated with UE 205, or the like.

In some implementations, OCS 240 may determine and/or provide billing information based on the RF access signaling usage update. For example, assume that an RF access signaling usage billing policy includes a first RF access signaling usage threshold and a second RF access signaling usage threshold, and a first billing rate and a second billing rate. Assume further that when RF access signaling usage of UE 205 satisfies the first RF access signaling usage threshold (e.g., when UE 205 requests and/or establishes more than a first threshold quantity of radio access bearers), that a subscriber associated with UE 205 is billed at the first billing rate. When OCS 240 receives an RF access signaling usage update indicating that UE 205 has established more than the first threshold quantity of radio access bearers, OCS 240 may provide billing information indicating to charge the subscriber associated with UE 205 at the first billing rate.

In the above example, when RF access signaling usage of UE 205 satisfies the second RF access signaling usage threshold (e.g., when UE 205 requests and/or establishes more than a second threshold quantity of radio access bearers), a subscriber associated with UE 205 is billed at the second billing rate. For example, OCS 240 may provide billing information to the subscriber, to HSS/AAA 235, to BSS 250, or to another device. In this way, OCS 240 may cause a subscriber associated with UE 205 to be billed at different rates according to RF access signaling usage of UE 205, which may reduce network congestion and/or offset costs associated with the RF access signaling usage of UE 205.

In some implementations, OCS 240 and/or PCRF 230 may provide a notification based on determining that the RF access signaling usage satisfies the first RF access signaling usage threshold. For example, OCS 240 and/or PCRF 230 may provide a notification to UE 205, to a subscriber associated with UE 205, to a network administrator or the like. The notification may include, for example, an email, a system message (e.g., a non-access stratum message, etc.), a short message service message, or the like. In this way, OCS 240 and/or PCRF 230 may notify the subscriber of an increased billing rate based on the RF access signaling usage billing policy, which may cause the subscriber to modify behavior with regard to UE 205 to reduce RF access signaling usage and, thus, reduce network congestion associated with UE 205.

In some implementations, PGW 225 may provide an RF access signaling usage update based on a cessation of a radio access bearer. For example, base station 210 may detect inactivity with regard to UE 205, and may cause MME 215 to end a radio access bearer associated with UE 205 and SGW 220. Based on ending the radio access bearer, and based on UE 205 being associated with the RF access signaling usage policy, SGW 220 may provide a modify bearer request to PGW 225. The modify bearer request may indicate that the radio access bearer is ending. PGW 225 may provide information indicating that the radio access bearer is ending to OCS 240 (e.g., in an RF access signaling usage update). In this way, PGW 225 may inform OCS 240 of the cessation of a radio access bearer, which may improve accuracy of enforcement of RF access signaling usage policies.

As further shown in FIG. 6, process 600 may include receiving information identifying a second RF access signaling usage threshold associated with the RF access signaling usage billing policy (block 650). For example, PGW 225 may receive information identifying a second RF access signaling usage threshold. In some implementations, PGW 225 may receive the information identifying the second RF access signaling usage threshold from another device, such as PCRF 230, OCS 240, or the like. The second RF access signaling usage threshold may be associated with the RF access signaling usage billing policy. For example, the second RF access signaling usage threshold may identify a second range of RF access signaling usage values and/or established radio access bearers that may be associated with a second billing rate in the RF access signaling usage billing policy.

In some implementations, PGW 225 may receive the information identifying the second RF access signaling usage threshold from PCRF 230. For example, PCRF 230 may cause PGW 225 to implement the second RF access signaling usage threshold (e.g., enforce a rule based on the second RF access signaling usage threshold, install the second RF access signaling usage threshold, use the second RF access signaling usage threshold, replace the first RF access signaling usage threshold with the second RF access signaling usage threshold, etc.). In such cases, PCRF 230 may receive the information identifying the second RF access signaling usage threshold from OCS 240. For example, OCS 240 may determine that RF access signaling usage, of UE 205, satisfies the first RF access signaling usage threshold, (e.g., matches a value of the first RF access signaling usage threshold, exceeds the value of the first RF access signaling usage threshold, etc.) and may determine the second RF access signaling usage threshold based on an RF access signaling usage billing policy that is stored by OCS 240.

As further shown in FIG. 6, process 600 may include storing and/or providing information based on the RF access signaling usage billing policy and/or the second RF access signaling usage threshold (block 660). For example, PGW 225 may store and/or provide information based on the RF access signaling usage billing policy and/or the second RF access signaling usage threshold. In some implementations, PGW 225 may provide a modify bearer response to SGW 220. For example, based on receiving a modify bearer request from SGW 220, PGW 225 may provide a modify bearer response to SGW 220. In some implementations, the modify bearer response may identify one or more actions to perform, as described in more detail in connection with FIG. 8, below.

In some implementations, PGW 225 may provide an RF access signaling usage update to OCS 240 based on the second RF access signaling usage threshold. For example, if PGW 225 receives a quantity of modify bearer requests from SGW 220 that satisfies the second RF access signaling usage threshold, PGW 225 may provide information identifying UE 205, the quantity of modify bearer requests, a value associated with the second RF access signaling usage threshold, a location of UE 205 and/or base station 210, or the like. In this way, PGW 225 may be configured to provide RF access signaling usage updates based on the second RF access signaling usage threshold, which may permit OCS 240 to charge a subscriber according to multiple, different levels of RF access signaling usage. By charging the subscriber according to the multiple, different levels of RF access signaling usage, OCS 240 may conserve network resources and/or offset costs associated with RF access signaling usage by UE 205.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7G are diagrams of an example implementation 700 relating to example process 600 shown in FIG. 6. FIGS. 7A-7G show an example of enforcing a radio frequency usage billing policy. For the purposes of FIGS. 7A-7G, assume that the operations described in connection with FIG. 5 have been performed.

Figure 7A:
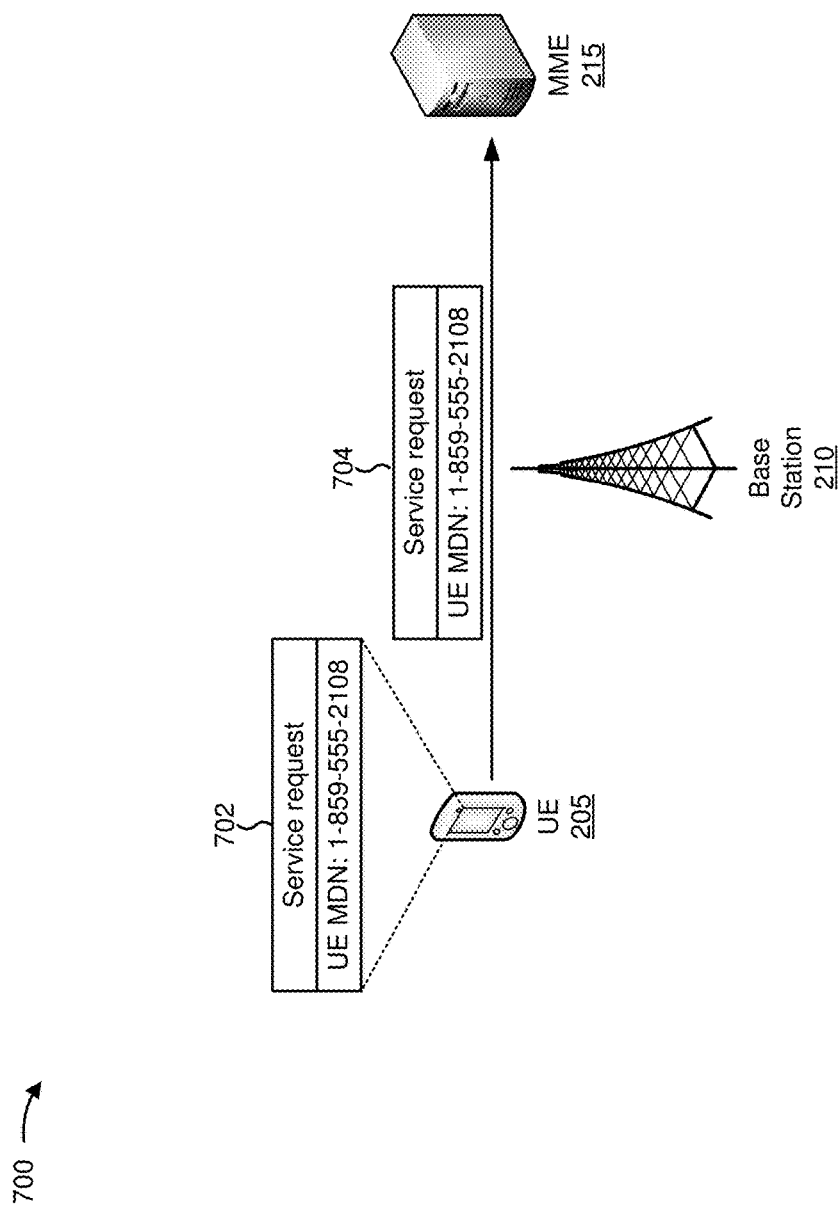
FIGS. 7A-7G are diagrams of an example implementation relating to the example process shown in FIG. 6.

As shown in FIG. 7A, and by reference number 702, UE 205 may generate a service request to establish a radio access bearer with base station 210 and SGW 220. As shown, the service request may identify UE 205 (e.g., based on an MDN of 1-859-555-2108). As shown by reference number 704, UE 205 may provide the service request via base station 210 to MME 215. Assume that MME 215 receives the service request.

Figure 7B:
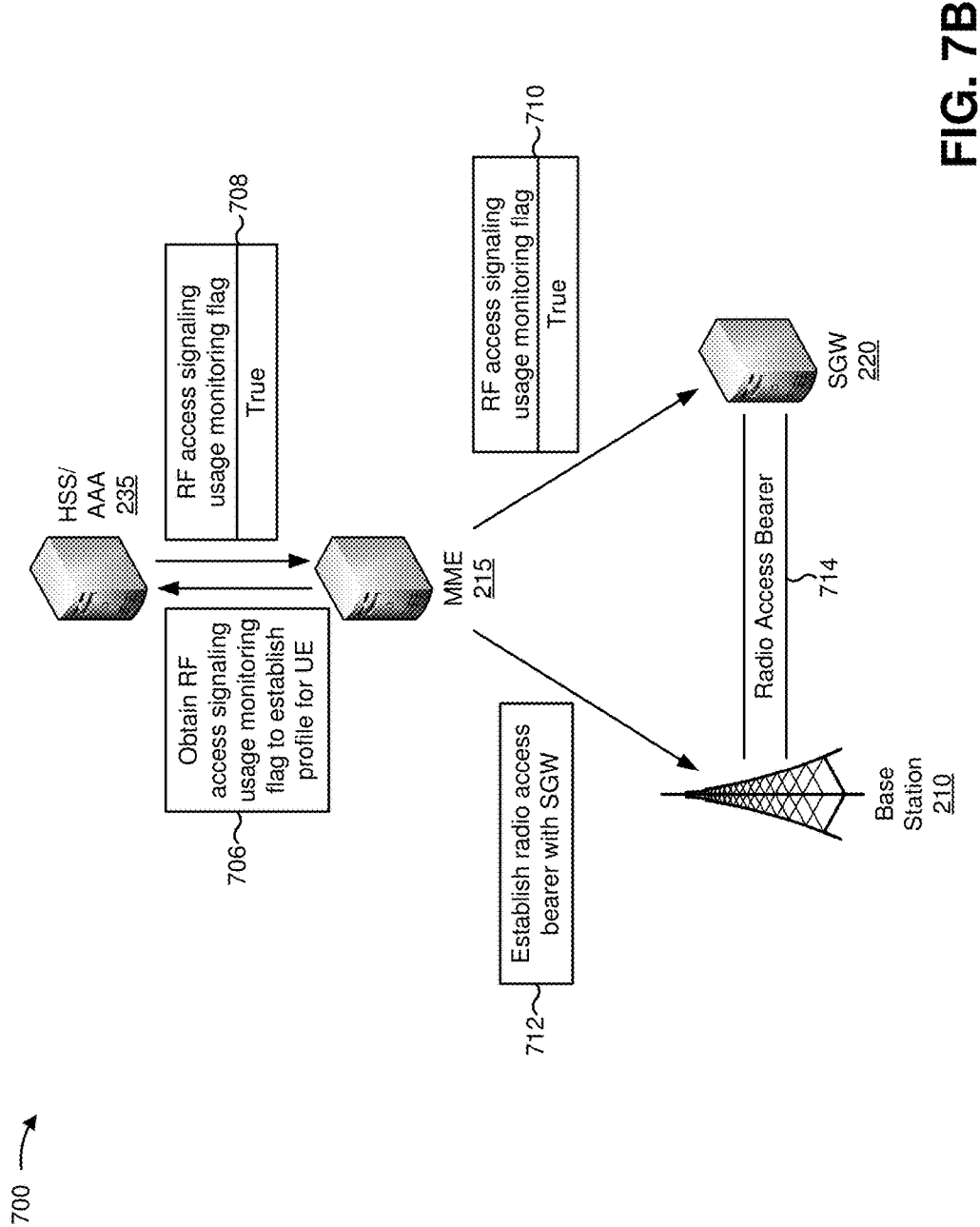

As shown in FIG. 7B, and by reference number 706, based on receiving the service request, MME 215 may obtain an RF access signaling usage monitoring flag from HSS/AAA 235 to determine whether UE 205 is subject to RF access signaling usage monitoring. As further shown, MME 215 may establish a profile for UE 205 based on the RF access signaling usage monitoring flag. The profile may associate the RF access signaling usage monitoring flag with UE 205. Based on the profile, MME 215 may determine that UE 205 is associated with the RF access signaling usage monitoring flag without obtaining the RF access signaling usage monitoring flag, which may reduce a quantity of messages transmitted by MME 215 and thus conserve network resources.

As shown by reference number 708, the RF access signaling usage monitoring flag may include a value of "true." As shown by reference number 710, MME 215 may provide the RF access signaling usage monitoring flag to SGW 220. As shown by reference number 712, MME 215 may cause base station 210 and SGW 220 to establish a radio access bearer. As shown by reference number 714, base station 210 and SGW 220 may establish the radio access bearer.

Figure 7C:
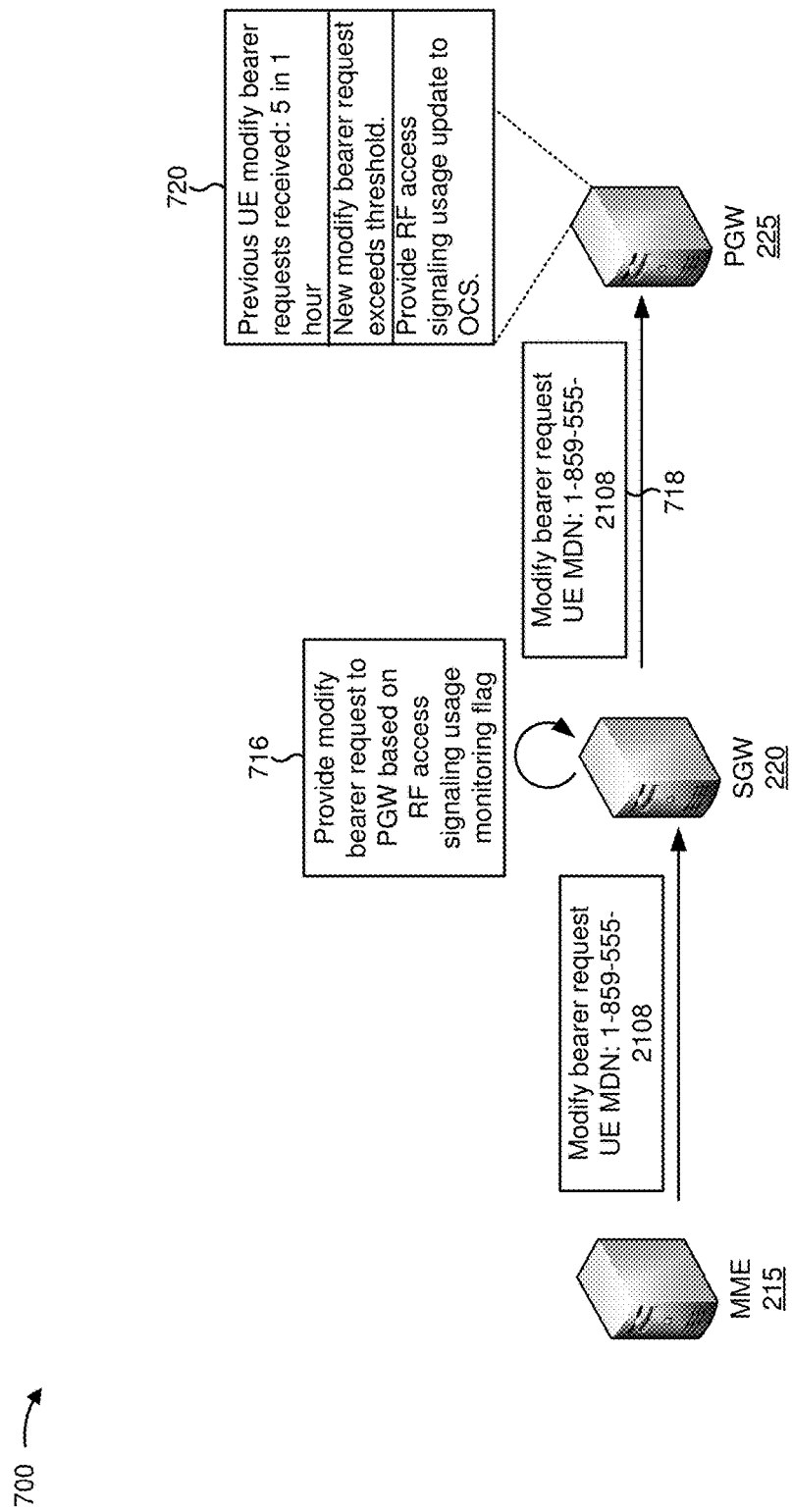

As shown in FIG. 7C, MME 215 may provide a modify bearer request to SGW 220 based on establishing the radio access bearer. As shown, the modify bearer request may identify UE 205. As shown by reference number 716, SGW 220 may determine to provide the modify bearer request to PGW 225 based on the RF access signaling usage monitoring flag. That is, based on UE 205 being associated with an RF access signaling usage billing policy and/or an RF access signaling usage control policy, SGW 220 may provide the modify bearer request to PGW 225. In this way, PGW 225 may monitor RF access signaling usage of UE 205 based on radio access bearers established in association with UE 205.

As shown by reference number 718, SGW 220 may provide information identifying UE 205 in association with the modify bearer request. Assume that PGW 225 receives the modify bearer request and the information identifying UE 205. As shown by reference number 720, PGW 225 may determine a quantity of modify bearer requests received, in association with UE 205, based on an RF access signaling usage threshold. Here, PGW 225 determines that PGW 225 has received five modify bearer requests, associated with UE 205, in the past hour. Accordingly, PGW 225 determines that the new, sixth modify bearer request exceeds the RF access signaling usage threshold. As shown, PGW 225 determines to provide an RF access signaling usage update to OCS 240.

Figure 7D:
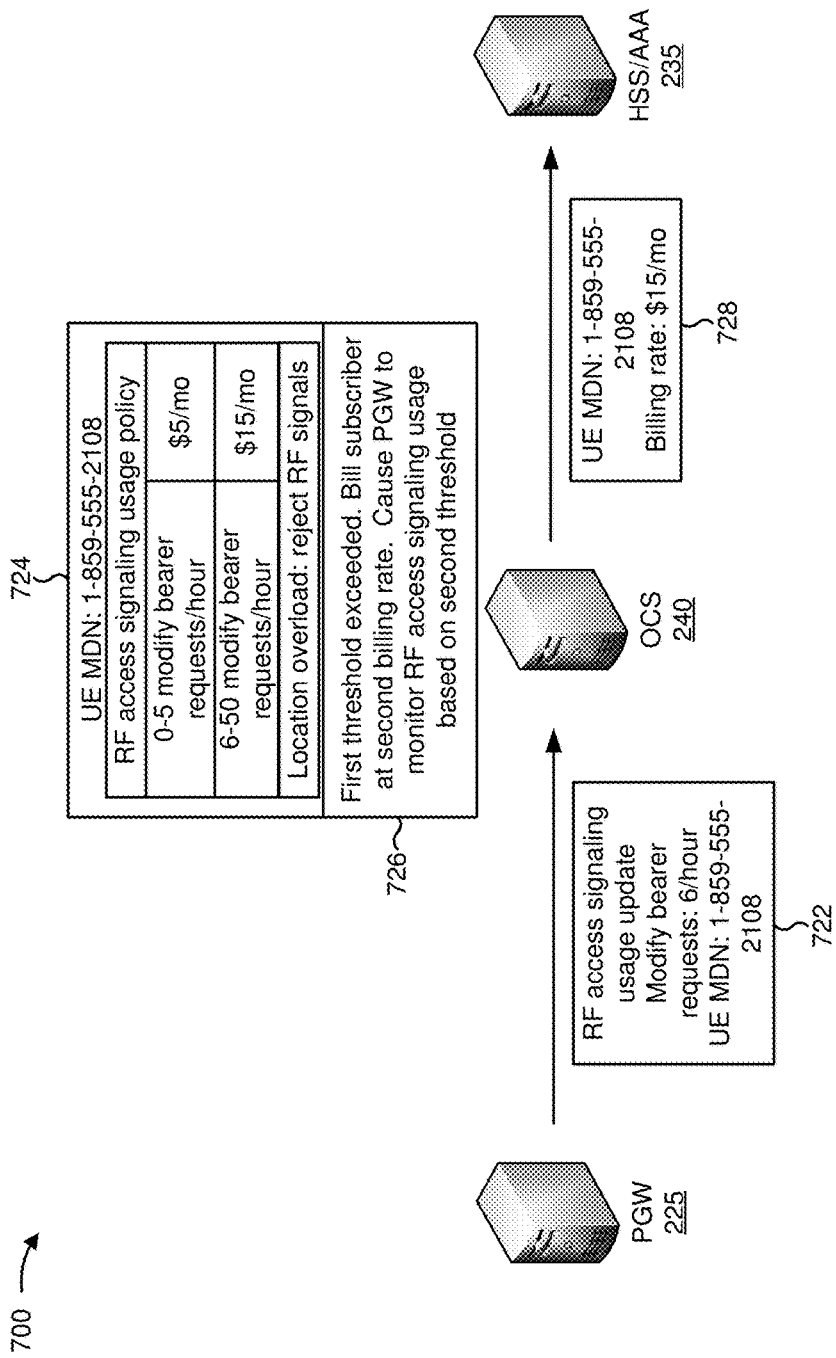

As shown in FIG. 7D, and by reference number 722, PGW 225 may provide an RF access signaling usage update to OCS 240. As shown, the RF access signaling usage update may identify UE 205, and may specify RF access signaling usage associated with UE 205 (e.g., 6 modify bearer requests/hour, indicating that UE 205 has established six radio access bearers in the past hour). As shown by reference number 724, OCS 240 may store the RF access signaling usage billing policy and the RF access signaling usage control policy. As shown by reference number 726, OCS 240 may determine that RF access signaling usage of UE 205 exceeds the first RF access signaling usage threshold (e.g., the first RF access signaling usage threshold of 0-5 modify bearer requests per hour, associated with a first billing rate of $5 per month).

As further shown by reference number 726, OCS 240 may determine to charge a subscriber, associated with UE 205, at the second billing rate (e.g., of $15 per month, associated with the second RF access signaling usage threshold of 6-50 modify bearer requests per hour). As shown, OCS 240 may determine to cause PGW 225 to monitor RF access signaling usage of UE 205 based on the second threshold of 6-50 modify bearer requests per hour. As shown by reference number 728, OCS 240 may provide billing information to HSS/AAA 235. Here, OCS 240 provides information indicating that UE 205 is associated with the second billing rate of $15 per month.

Figure 7E:
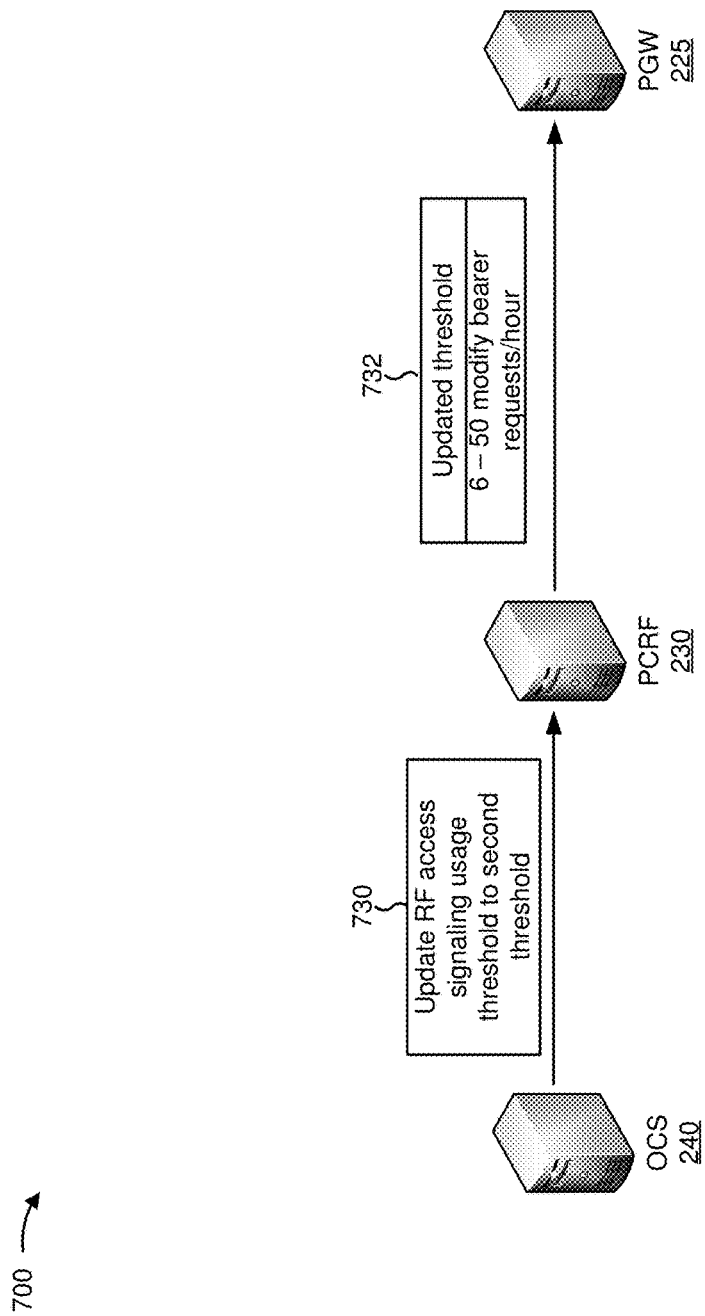

As shown in FIG. 7E, and by reference number 730, OCS 240 may provide information to PCRF 230 indicating to update a rule based on a value of the second RF access signaling usage threshold. As shown by reference number 732, PCRF 230 may provide an updated rule to PGW 225. Assume that PCRF 230 causes PGW 225 to monitor RF access signaling usage of UE 205 based on the updated rule and the second RF access signaling usage threshold.

Figure 7F:
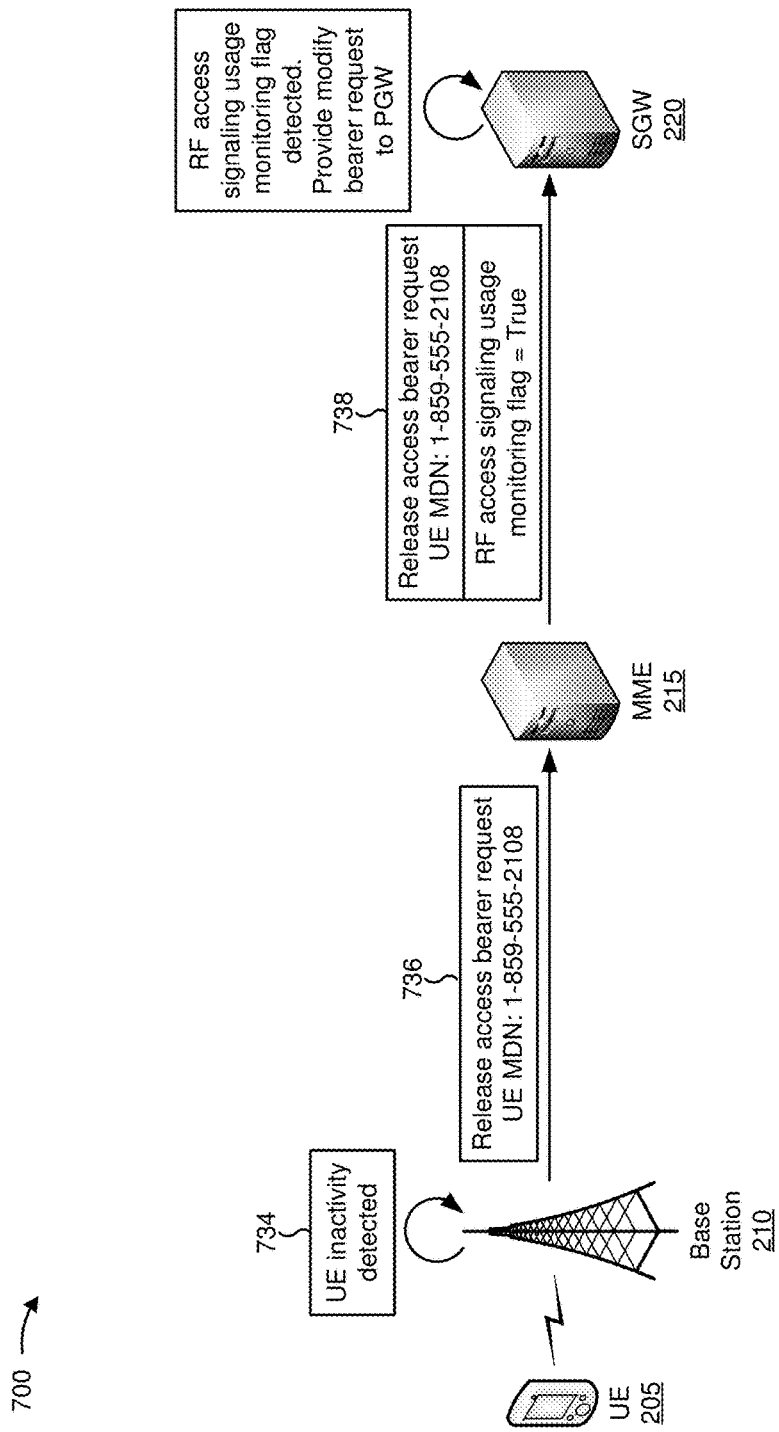

As shown in FIG. 7F, and by reference number 734, base station 210 may detect inactivity of UE 205. As shown by reference number 736, based on detecting the inactivity, base station 210 may request to release the radio access bearer (e.g., by transmitting a "release access bearer request" that identifies UE 205). Assume that MME 215 receives the release access bearer request, and assume that MME 215 determines that UE 205 is associated with the RF access signaling usage billing policy and/or the RF access signaling usage control policy. As shown by reference number 738, MME 215 may provide the release access bearer request to SGW 220 in association with the RF access signaling usage monitoring flag value of "true." Assume that MME 215 provides the release access bearer request to SGW 220 to cause SGW 220 to release the radio access bearer. As shown, SGW 220 determines to provide a modify bearer request to PGW 225 based on the RF access signaling usage monitoring flag (e.g., to provide PGW 225 with RF access signaling usage information related to UE 205).

Figure 7G:
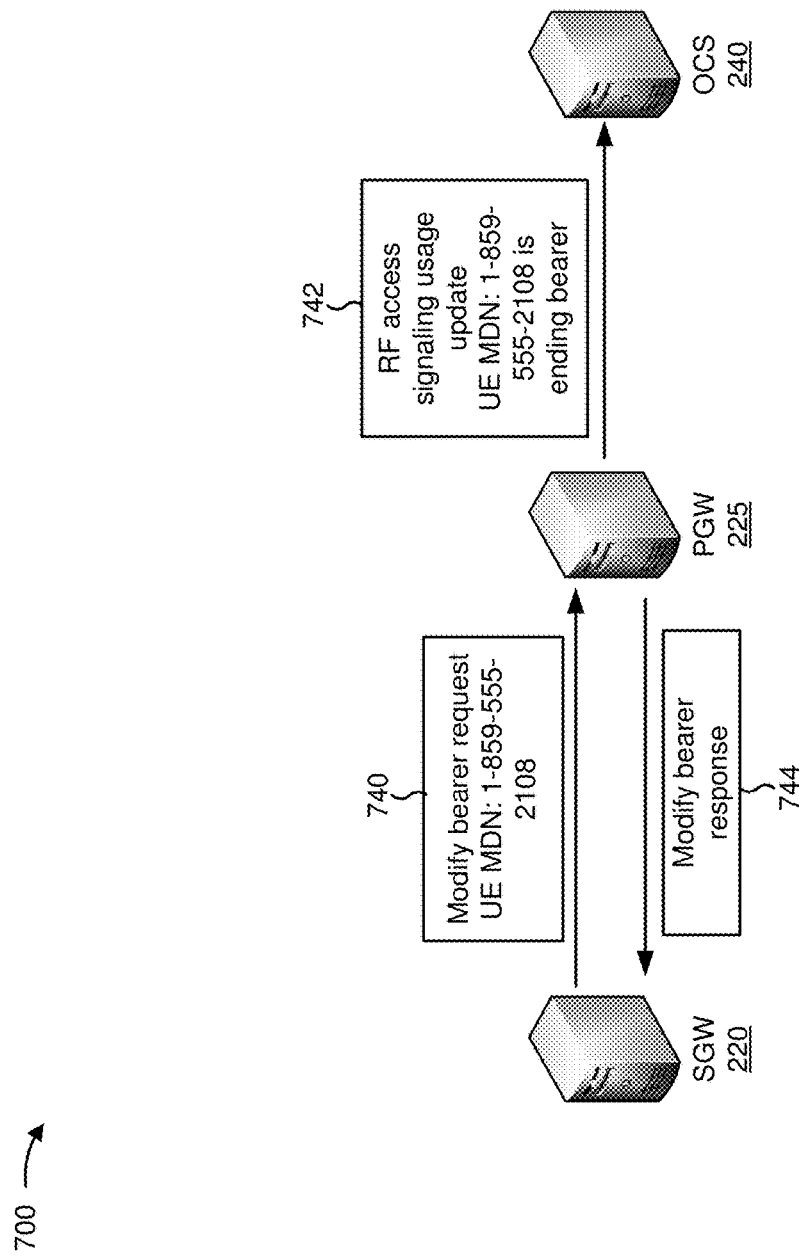

As shown in FIG. 7G, and by reference number 740, SGW 220 provides a modify bearer request to PGW 225 based on receiving the release access bearer request and based on UE 205 being associated with the RF access signaling usage policy. As shown by reference number 742, based on the modify bearer request, PGW 225 provides an RF access signaling usage update to OCS 240 that indicates that UE 205 is ending the radio access bearer with SGW 220. As shown by reference number 744, PGW 225 provides a modify bearer response to SGW 220 (e.g., based on receiving the modify bearer request from SGW 220). In this way, OCS 240 may monitor and/or provide billing information related to an RF access signaling usage billing plan, which may permit a network provider to offset costs related to RF access signaling usage and/or conserve network resources.

As indicated above, FIGS. 7A-7G are provided merely as an example. Other examples are possible and may differ from what was described with regard to FIGS. 7A-7G.

FIG. 8 is a flow chart of an example process 800 for enforcing a radio frequency usage control policy. In some implementations, one or more process blocks of FIG. 8 may be performed by PGW 225. In some implementations, one or more process blocks of FIG. 8 may be performed by another device or a group of devices separate from or including PGW 225, such as UE 205, base station 210, MME 215, SGW 220, PCRF 230, HSS/AAA 235, OCS 240, and/or BSS 250.

As shown in FIG. 8, process 800 may include receiving a modify bearer request associated with establishing a radio access bearer between a UE and a serving gateway (block 810). For example, PGW 225 may receive a modify bearer request. The modify bearer request may be associated with establishing a radio access bearer between UE 205 and SGW 220. In some implementations, PGW 225 may receive the modify bearer request from SGW 220. For example, SGW 220 may provide the modify bearer request based on UE 205 being associated with an RF access signaling usage billing policy and/or an RF access signaling usage control policy, as described in more detail in connection with block 610 of FIG. 6, above. The modify bearer request may include, for example, information identifying a radio access bearer, information identifying UE 205 (e.g., an MDN, an IMEI, an IMSI, an IP address, etc.), information identifying a location associated with UE 205 and/or base station 210 (e.g., a CID, a LAC, etc.), or the like.

As further shown in FIG. 8, process 800 may include determining that the UE is associated with an RF access signaling usage control policy and an RF access signaling usage threshold (block 820). For example, PGW 225 may determine that UE 205 is associated with an RF access signaling usage control policy. In some implementations, PGW 225 may determine that UE 205 is associated with the RF access signaling usage control policy based on locally stored information. Additionally, or alternatively, PGW 225 may obtain information indicating that UE 205 is associated with the RF access signaling usage control policy from another device, such as MME 215, PCRF 230, HSS/AAA 235, OCS 240, or the like.

In some implementations, PGW 225 may determine that UE 205 is associated with the RF access signaling usage control policy based on the modify bearer request. For example, the modify bearer request may include information related to monitoring RF access signaling usage of UE 205, and PGW 225 may determine that UE 205 is associated with the RF access signaling usage control policy based on the information. Additionally, or alternatively, the modify bearer request may include information indicating that UE 205 is associated with the RF access signaling usage control policy. For example, SGW 220 may transmit a flag, a bit, or the like, that identifies UE 205 as being associated with the RF access signaling usage control policy.

As further shown in FIG. 8, process 800 may include providing an RF access signaling usage update based on receiving the modify bearer request, based on the RF access signaling usage control policy, and/or based on the RF access signaling usage threshold (block 830). For example, PGW 225 may provide an RF access signaling usage update based on receiving the modify bearer request, based on the RF access signaling usage control policy, and/or based on the RF access signaling usage threshold. The RF access signaling usage update may include information related to RF access signaling usage of UE 205. For example, the RF access signaling usage update may identify a location associated with UE 205 and/or base station 210, a device identifier of UE 205, a quantity and/or duration of RF signals associated with UE 205, an RF access signaling usage threshold that UE 205 satisfies, or the like.

In some implementations, PGW 225 may provide an RF access signaling usage update based on the modify bearer request. For example, PGW 225 may include information, from the modify bearer request, in the RF access signaling usage update. In some implementations, PGW 225 may determine information, based on the modify bearer request, to include in the RF access signaling usage update. For example, PGW 225 may store information identifying a quantity of radio access bearers associated with UE 205, and times associated with the radio access bearers. Based on the quantity and the times, PGW 225 may determine RF access signaling usage information (e.g., a quantity of modify bearer requests received in a particular time period, whether UE 205 is associated with an always-on radio access bearer, etc.), and may provide the RF access signaling usage information in the RF access signaling usage update.

In some implementations, PGW 225 may provide an RF access signaling usage update based on the RF access signaling usage policy. For example, PGW 225 may determine that UE 205 is associated with the RF access signaling usage policy, and may provide an RF access signaling usage update accordingly. Additionally, or alternatively, PGW 225 may determine that RF access signaling usage associated with UE 205 satisfies a threshold of the RF access signaling usage policy, and may provide an RF access signaling usage update accordingly.

In some implementations, PGW 225 may provide the RF access signaling usage update to OCS 240. OCS 240 may determine an action to perform based on the RF access signaling usage update. For example, OCS 240 may compare RF access signaling usage of UE 205 to the RF access signaling usage threshold associated with the RF access signaling usage control policy, and may determine an action to perform based on the RF access signaling usage control policy. The action to perform may include, for example, modifying a priority of RF signals associated with UE 205 (e.g., to associate the RF signals with a higher priority than other signals, a lower priority than other signals, etc.), providing a notification based on the RF access signaling usage (e.g., to UE 205, to a subscriber associated with UE 205, to a care and operations device associated with the LTE network, etc.), redirecting RF signals to a different base station 210 and/or a different SGW 220 (e.g., a different base station 210 and/or a different SGW 220 than one with which UE 205 is associated), delaying and/or dropping RF signals associated with UE 205, or the like.

In some implementations, PCRF 230 may determine the action to perform. For example, PCRF 230 may receive information identifying the RF access signaling usage control policy and the RF access signaling usage update from OCS 240, and PCRF 230 may determine the action to perform according to the RF access signaling usage control policy. In some implementations, PCRF 230 may generate a rule, based on the RF access signaling usage control policy, and may cause PGW 225 to enforce the rule.

In some implementations, PCRF 230 and/or OCS 240 may determine the action to perform based on an overload notification from SON device 245. For example, SON device 245 may provide an overload notification indicating that a particular location is associated with a relatively high RF access signaling usage (e.g., usage that satisfies a threshold), and PCRF 230 and/or OCS 240 may determine to re-route some, or all, of the information associated with RF signals of the particular location (e.g., by providing the information via another connection, such as a satellite connection, a WiFi connection, etc.). In this way, PCRF 230 and/or OCS 240 may reroute information based on differences between RF access signaling usage in different locations, which may better distribute RF access signaling usage in the LTE network and reduce network congestion.

As further shown in FIG. 8, process 800 may include receiving information identifying an action to perform with regard to the UE (block 840). For example, PGW 225 may receive information identifying an action to perform with regard to UE 205. In some implementations, PGW 225 may receive the information identifying an action to perform from PCRF 230. For example, PCRF 230 may receive information identifying the action to perform from OCS 240, and PCRF 230 may provide information identifying the action to perform to PGW 225.

As further shown in FIG. 8, process 800 may include causing the action to be performed by providing information identifying the action in a modify bearer response (block 850). For example, PGW 225 may provide a modify bearer response to SGW 220. The modify bearer response may include information identifying the action to perform. For example, the modify bearer response may include a string of characters, a code, a flag, or the like, that identifies the action to perform.

In some implementations, MME 215 may perform the action. For example, SGW 220 may provide the action to perform to MME 215 in a modify bearer response. MME 215 may determine the action to perform based on the information, and may perform the action accordingly. For example, MME 215 may deny a service request from UE 205, may cause SGW 220 and/or base station 210 to end a session (e.g., an RRC connection, a dedicated radio bearer, a radio access bearer, etc.) with UE 205, may redirect a service request from UE 205 to another MME 215, may modify priority of RF signals associated with UE 205, or the like. In this way, PGW 225 and/or OCS 240 may determine an action to perform based on an RF access signaling usage policy, and may cause the action to be performed, which may reduce network congestion and/or improve efficiency of communication via RF signals in the LTE network.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

FIGS. 9A-9F are diagrams of an example implementation 900 relating to example process 800 shown in FIG. 8. FIGS. 9A-9F show an example of enforcing a radio frequency usage control policy. For the purpose of FIGS. 9A-9F, assume that the operations described in connection with FIG. 5 have been performed.

Figure 9A:
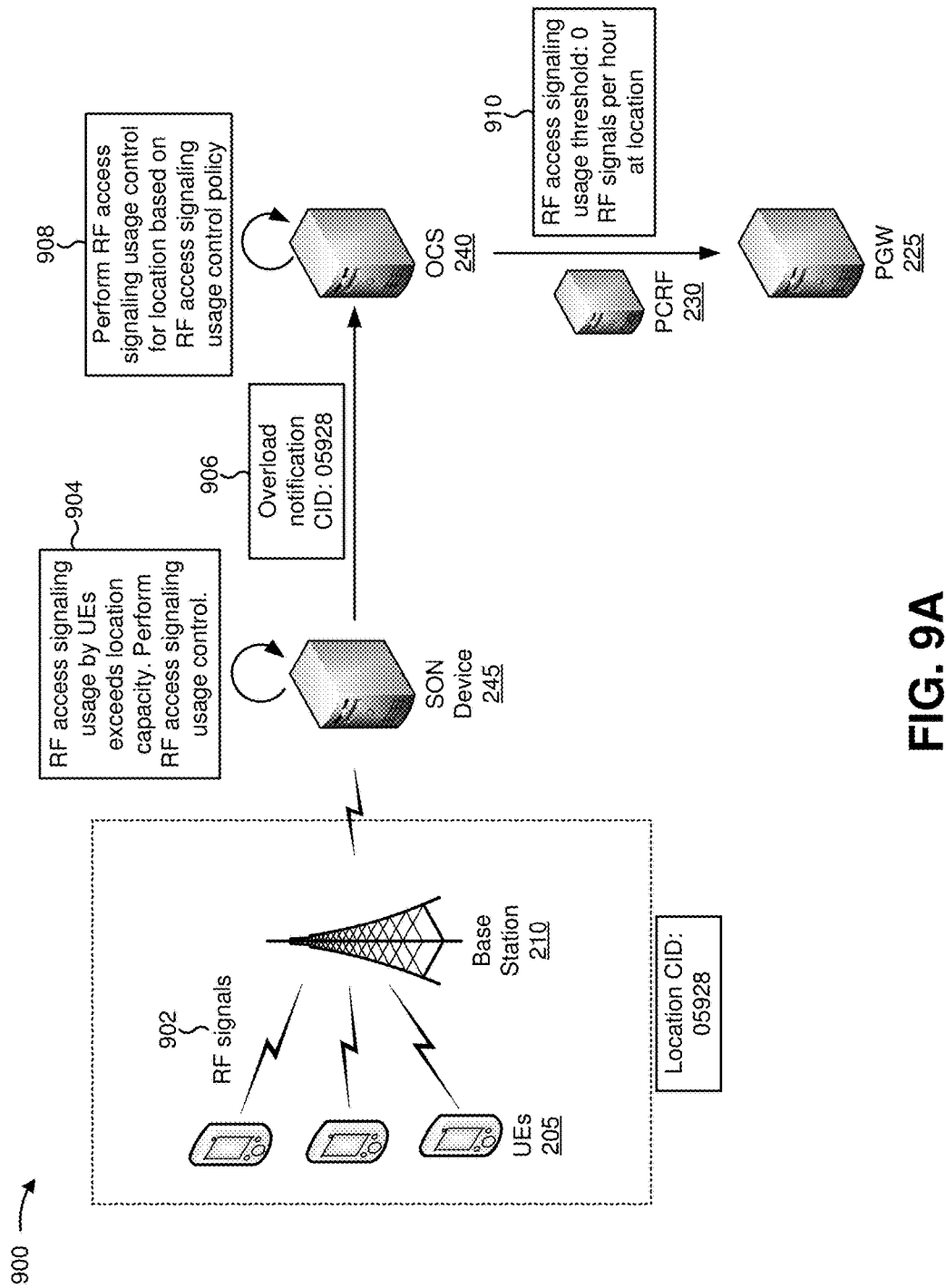

As shown in FIG. 9A, and by reference number 902, a set of UEs 205 may provide RF signals (e.g., via a set of radio access bearers) to base station 210. As further shown, the set of UEs 205, and base station 210, may be associated with a particular location (e.g., a location associated with a CID of 05928). As shown by reference number 904, SON device 245 may determine that RF access signaling usage by the set of UEs 205 exceeds an RF access signaling usage capacity associated with the particular location. As further shown, SON device 245 may determine to cause OCS 240 to perform RF access signaling usage control with regard to the particular location.

As shown by reference number 906, SON device 245 may provide an overload notification to OCS 240. As further shown, the overload notification may identify the particular location (e.g., based on the CID of 05928). As shown by reference number 908, OCS 240 may determine to perform RF access signaling usage control based on an RF access signaling usage control policy. Assume that the RF access signaling usage control policy indicates to reject any RF signal (e.g., any radio access bearer) that is associated with the particular location. As shown by reference number 910, OCS 240 may provide identifying the RF access signaling usage threshold (e.g., zero RF signals per hour) associated with the location to PGW 225. Assume that PCRF 230 causes PGW 225 to monitor RF access signaling usage of UE 205 based on the RF access signaling usage threshold of zero RF signals per hour.

As shown in FIG. 9B, UE 205, at the particular location, may provide a service request to establish a radio access bearer with base station 210 and SGW 220. As shown, the service request may identify UE 205 (e.g., based on an MDN of 1-859-555-2168). As shown by reference number 912, UE 205 may provide the service request via base station 210 to MME 215. Assume that MME 215 receives the service request.

Figure 9C:
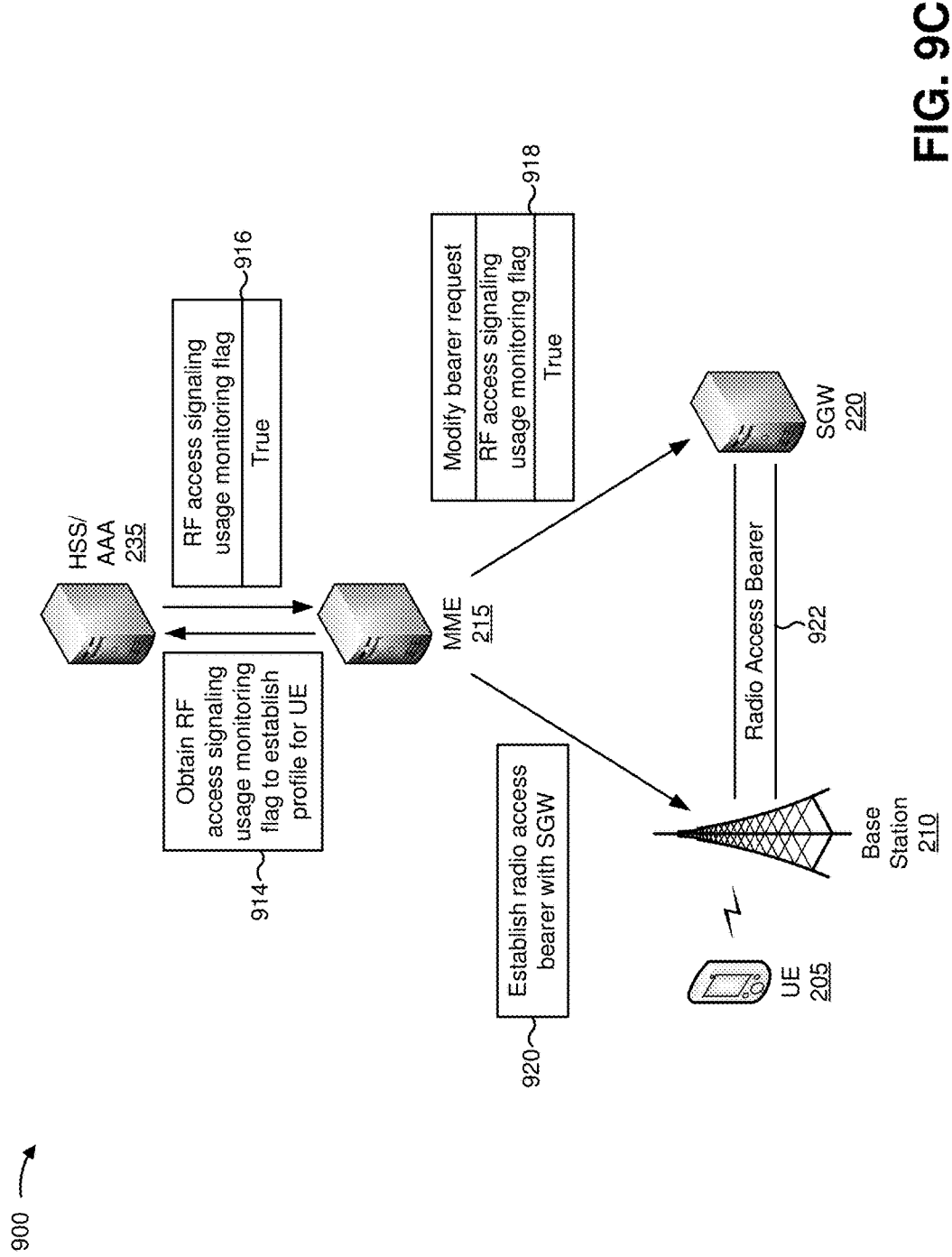

As shown in FIG. 9C, and by reference number 914, based on receiving the service request, MME 215 may obtain an RF access signaling usage monitoring flag, associated with UE 205, from HSS/AAA 235. As further shown, MME 215 may establish a profile for UE 205 based on the RF access signaling usage monitoring flag. The profile may associate the RF access signaling usage monitoring flag with UE 205. Based on the profile, MME 215 may determine that UE 205 is associated with the RF access signaling usage monitoring flag without obtaining the RF access signaling usage monitoring flag, which may reduce a quantity of messages transmitted by MME 215 and thus conserve network resources.

As shown by reference number 916, the RF access signaling usage monitoring flag may include a value of "true," which may indicate that UE 205 is associated with an RF access signaling usage billing policy and/or an RF access signaling usage control policy. As shown by reference number 918, MME 215 may provide a modify bearer request, including the RF access signaling usage monitoring flag, to SGW 220. As shown by reference number 920, MME 215 may cause base station 210 and SGW 220 to establish a radio access bearer. As shown by reference number 922, base station 210 and SGW 220 may establish the radio access bearer.

Figure 9D:
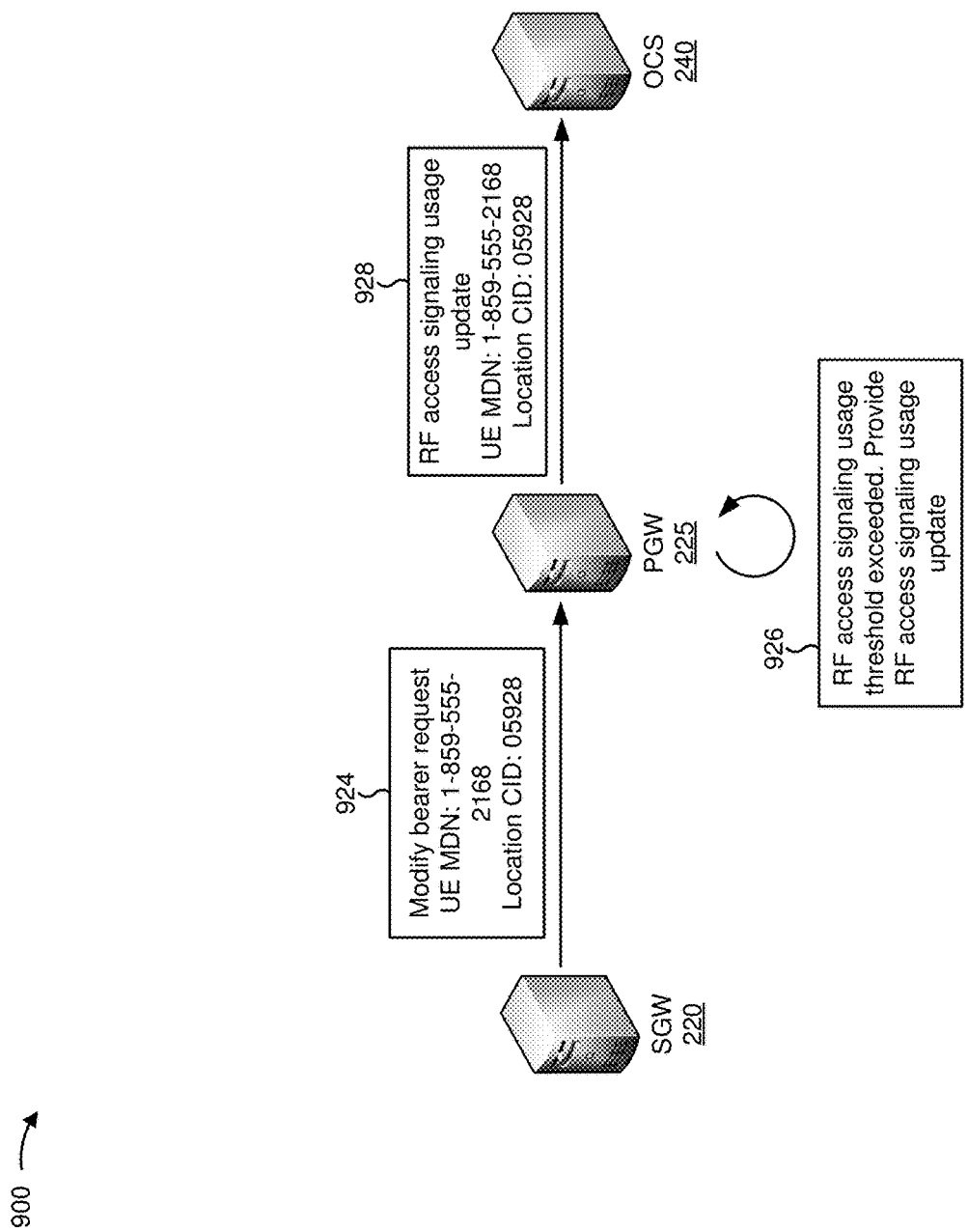

As shown in FIG. 9D, and by reference number 924, SGW 220 may provide the modify bearer request, including information identifying UE 205 and the particular location, to PGW 225. Assume that SGW 220 provides the modify bearer request based on the modify bearer request including the RF access signaling usage monitoring flag. As shown by reference number 926, PGW 225 may determine, based on the modify bearer request, that UE 205 satisfies the RF access signaling usage threshold associated with the particular location. As shown, based on determining that UE 205 satisfies the RF access signaling usage threshold, PGW 225 may provide an RF access signaling usage update. As shown by reference number 928, PGW 225 provides the RF access signaling usage update, including information identifying UE 205 and the particular location, to OCS 240.

Figure 9E:
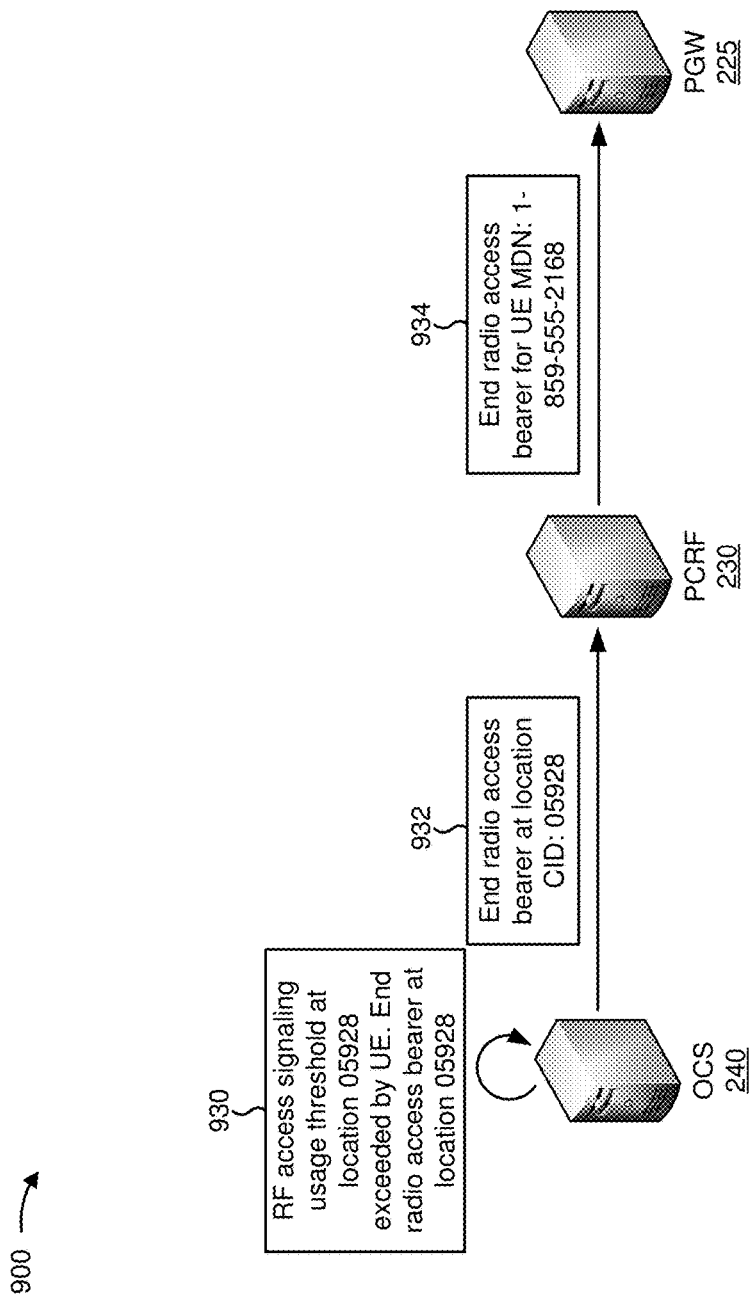

As shown in FIG. 9E, and by reference number 930, OCS 240 may determine that the RF access signaling usage of UE 205 exceeds the RF access signaling usage threshold associated with the particular location. Based on determining that the RF access signaling usage at the particular location exceeds the RF access signaling usage threshold for the particular location, OCS 240 may determine to end a radio access bearer associated with the particular location. As shown by reference number 932, OCS 240 may provide information to PCRF 230 indicating to end a radio access bearer at the particular location. Assume that PCRF 230 determines to end the radio access bearer associated with UE 205. As shown by reference number 934, PCRF 230 may provide information, to PGW 225, indicating to end the radio access bearer associated with UE 205. Assume that PGW 225 receives the information indicating to end the radio access bearer.

Figure 9F:
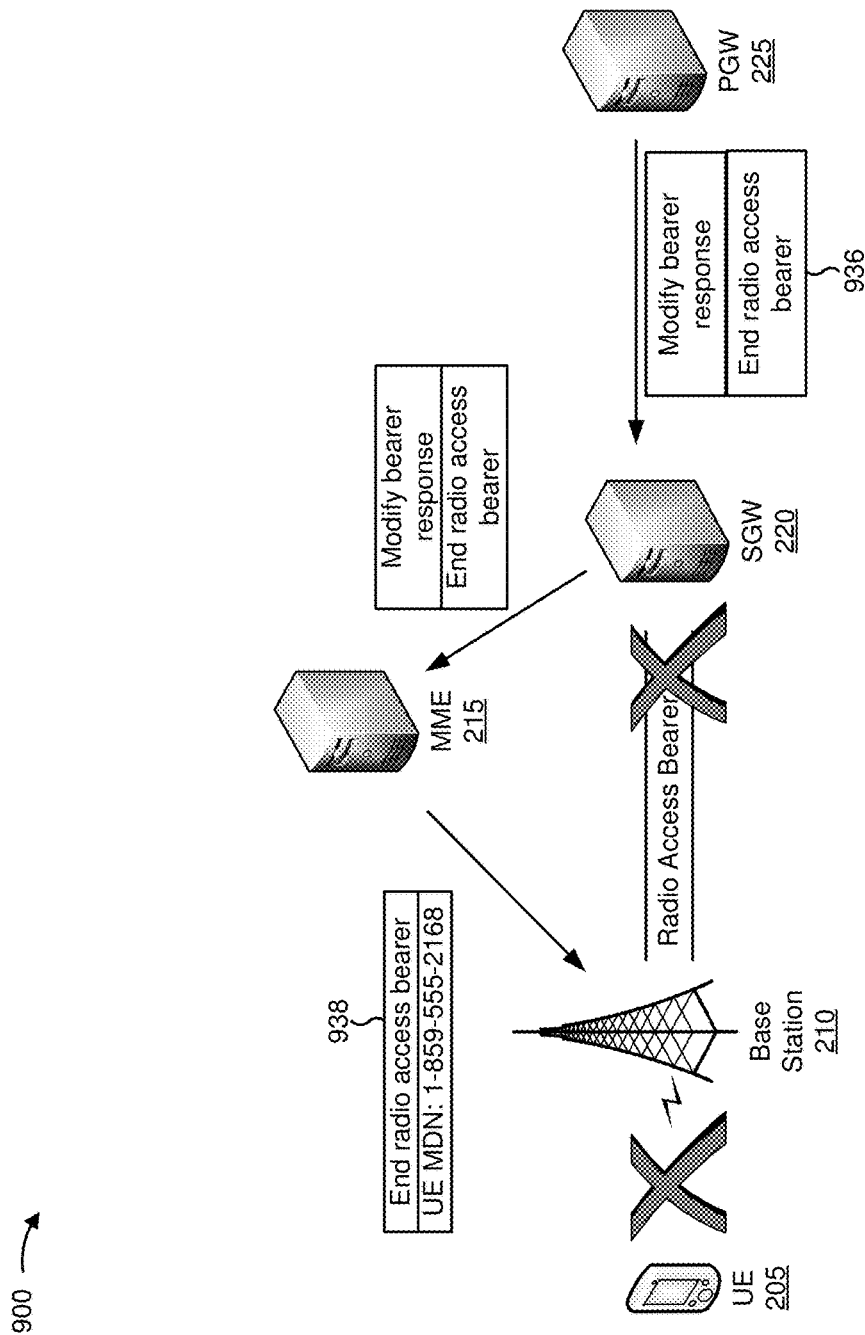

As shown in FIG. 9F, and by reference number 936, PGW 225 may provide a modify bearer response to SGW 220. As shown, the modify bearer response may identify an action to perform (e.g., ending the radio access bearer with UE 205). As shown, SGW 220 may provide the modify bearer request to MME 215. As shown by reference number 938, based on the information indicating to end the radio access bearer, MME 215 may cause base station 210 and/or SGW 220 to end the radio access bearer with UE 205. In this way, OCS 240 may enforce RF access signaling usage control policies by causing MME 215 to perform an action based on the RF access signaling usage control policies, which may reduce network congestion based on RF access signaling usage and/or improve network efficiency.

As indicated above, FIGS. 9A-9F are provided merely as an example. Other examples are possible and may differ from what was described with regard to FIGS. 9A-9F.

In this way, an OCS may cause network devices to perform actions and/or bill an appropriate party for RF access signaling usage, which may offset costs associated with the RF access signaling usage, reduce network congestion associated with the RF access signaling usage, and/or increase network efficiency.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive information identifying a radio frequency (RF) access signaling usage policy,
the RF access signaling usage policy being associated with a user equipment (UE),
the UE communicating with a network device using RF signals, and
the RF access signaling usage policy identifying one or more actions to perform based on RF access signaling usage of the UE,
the RF access signaling usage of the UE being determined based on a quantity of bearers requested by the UE or established in relation to the UE,
the bearers including routing information for the RF signals;
determine an RF access signaling usage threshold based on the RF access signaling usage policy;
cause a gateway device to monitor the RF access signaling usage of the UE;
receive an RF access signaling usage update, related to the RF access signaling usage of the UE, based on the monitoring;
determine that the RF access signaling usage of the UE satisfies the RF access signaling usage threshold based on the RF access signaling usage update; and
cause, based on determining that the RF access signaling usage of the UE satisfies the RF access signaling usage threshold, an action to be performed with regard to the UE based on the RF access signaling usage policy.

2. The device of claim 1,
where the RF access signaling usage threshold is associated with a billing rate;
where the one or more processors are further to:
determine the billing rate,
the billing rate identifying a monetary amount to charge a subscriber based on the UE satisfying the RF access signaling usage threshold; and
where the one or more processors, when causing the action to be performed, are to:
cause the subscriber to be charged based on the billing rate.

3. The device of claim 1,
where the RF access signaling usage policy is associated with a control action,
the control action relating to controlling the RF access signaling usage of the UE; and
where the one or more processors, when causing the action to be performed, are to:
cause the control action to be performed with regard to the UE based on the RF access signaling usage policy.

4. The device of claim 3, where the control action includes at least one of:
assigning a priority to an RF signal associated with the UE, providing information to the UE and/or a subscriber associated with the UE,
delaying an RF signal associated with the UE,
dropping an RF signal associated with the UE, or
providing billing information associated with the UE.

5. The device of claim 1,
where the one or more processors are further to:
receive an overload notification,
the overload notification indicating that a particular location is associated with a particular quantity of RF access signaling usage,
the UE being associated with the particular location;
where the one or more processors, when determining that the RF access signaling usage satisfies the RF access signaling usage threshold, are to:
determine that the RF access signaling usage satisfies the RF access signaling usage threshold based on the overload notification; and
where the one or more processors, when causing the action to be performed, are to:
cause the action to be performed based on the overload notification.

6. The device of claim 1,
where the one or more processors, when causing the gateway device to monitor the RF access signaling usage, are to:
provide information identifying the RF access signaling usage threshold to the gateway device; and
cause the gateway device to monitor the RF access signaling usage of the UE based on the RF access signaling usage threshold; and
where the one or more processors, when receiving the RF access signaling usage update, are to:
receive the RF access signaling usage update based on the RF access signaling usage of the UE satisfying the RF access signaling usage threshold.

7. The device of claim 6,
where the RF access signaling usage threshold is a first RF access signaling usage threshold; and
where the one or more processors, when causing the action to be performed, are to:
determine a second RF access signaling usage threshold based on the RF access signaling usage policy;
provide the second RF access signaling usage threshold to the gateway device; and
cause the gateway device to monitor the RF access signaling usage of the UE based on the second RF access signaling usage threshold.

8. A non-transitory computer-readable medium storing instructions, the instructions comprising:
one or more instructions that, when executed by one or more processors of a device, cause the one or more processors to:
receive first information related to a radio frequency (RF) access signaling usage policy associated with a user equipment (UE),
the UE communicating with a network device using RF signals;
receive RF access signaling usage information related to RF access signaling usage of the UE;
the RF access signaling usage of the UE being determined based on a quantity of bearers requested by the UE or established in relation to the UE,
a bearer, of the bearers, including routing information for the RF signals;
determine that the RF access signaling usage of the UE satisfies an RF access signaling usage threshold identified by the first information;
provide an RF access signaling usage update based on the RF access signaling usage satisfying the RF access signaling usage threshold;
receive second information, relating to an action to perform with regard to the UE, based on providing the RF access signaling usage update; and
store and/or provide the second information.

9. The non-transitory computer-readable medium of claim 8, where the one or more instructions, that cause the one or more processors to receive the RF access signaling usage information, cause the one or more processors to:
receive the RF access signaling usage information in a modify bearer request,
the modify bearer request being received based on the UE requesting a bearer and based on the UE being associated with the RF access signaling usage policy.

10. The non-transitory computer-readable medium of claim 8, where the second information identifies the action to perform,
the action including at least one of:
assigning a priority to an RF signal associated with the UE,
providing information to the UE and/or a subscriber associated with the UE,
delaying an RF signal associated with the UE,
dropping an RF signal associated with the UE, or
providing billing information associated with the UE.

11. The non-transitory computer-readable medium of claim 10, where the one or more instructions, that cause the one or more processors to provide the second information, cause the one or more processors to:
cause the action to be performed by providing the second information, that identifies the action, in a modify bearer response to a second device,
the modify bearer response being provided to the second device based on receiving a modify bearer request from the second device.

12. The non-transitory computer-readable medium of claim 8,
where the RF access signaling usage information identifies a plurality of modify bearer requests corresponding to a plurality of bearers associated with the UE; and
where the one or more instructions, that cause the one or more processors to determine that the RF access signaling usage satisfies the RF access signaling usage threshold, cause the one or more processors to:
determine that the RF access signaling usage satisfies the RF access signaling usage threshold based on a quantity of the plurality of modify bearer requests,
the RF access signaling usage threshold identifying a threshold quantity, and
the quantity of the plurality of modify bearer requests being greater than or equal to the threshold quantity.

13. The non-transitory computer-readable medium of claim 8,
where the RF access signaling usage threshold is a first RF access signaling usage threshold; and
where the one or more instructions further cause the one or more processors to:
receive information identifying a second RF access signaling usage threshold; and
monitor the RF access signaling usage based on the second RF access signaling usage threshold.

14. The non-transitory computer-readable medium of claim 8, where the one or more instructions, when executed by the one or more processors, further cause the one or more processors to:
- receive a message associated with ending a bearer associated with the UE; and
- provide another RF access signaling usage update based on receiving the message.

15. A method, comprising:
- receiving, by a device, information identifying a radio frequency (RF) access signaling usage policy,
    - the RF access signaling usage policy being associated with a user equipment (UE),
        - the UE communicating with a network using RF signals transmitted via a bearer, and
    - the RF access signaling usage policy identifying an RF access signaling usage threshold;
- causing, by the device, a gateway device to monitor RF access signaling usage of the UE,
    - the gateway device determining the RF access signaling usage of the UE based on a quantity of bearers requested by the UE;
- receiving, by the device, an RF access signaling usage update, related to RF access signaling usage of the UE, based on the monitoring;
- determining, by the device, that the RF access signaling usage of the UE satisfies the RF access signaling usage threshold based on the RF access signaling usage update; and
- causing, by the device and based on determining that the RF access signaling usage of the UE satisfies the RF access signaling usage threshold, an action to be performed with regard to the UE based on the RF access signaling usage policy.

16. The method of claim 15, further comprising:
- receiving information identifying a location associated with the UE,
    - the location being associated with a particular quantity of bearers,
        - where determining that the RF access signaling usage satisfies the RF access signaling usage threshold comprises:
            - determining that the RF access signaling usage satisfies the RF access signaling usage threshold based on the particular quantity of bearers, the particular quantity of bearers being greater than the quantity of bearers identified by the RF access signaling usage threshold.

17. The method of claim 15,
where the RF access signaling usage update identifies a bearer, associated with the UE, that is established for a threshold period of time, and
where causing the action to be performed comprises:
- causing the action to be performed based on the bearer being established for the threshold period of time.

18. The method of claim 15, further comprising:
providing the RF access signaling usage threshold to the gateway device,
- where receiving the RF access signaling usage update further comprises:
    - receiving the RF access signaling usage update based on the gateway device determining that the RF access signaling usage satisfies the RF access signaling usage threshold.

19. The method of claim 18,
where the RF access signaling usage threshold is satisfied when the UE requests a particular quantity of bearers in a particular period of time; and
where receiving the RF access signaling usage update comprises:
- receiving the RF access signaling usage update based on the gateway device determining that the UE requested the particular quantity of bearers within the particular period of time.

20. The method of claim 15, further comprising:
providing information identifying the RF access signaling usage threshold to the gateway device; and
causing the gateway device to monitor the RF access signaling usage associated with the UE based on the RF access signaling usage threshold,
- where receiving the RF access signaling usage update comprises:
    - receiving the RF access signaling usage update based on the RF access signaling usage associated with the UE satisfying the RF access signaling usage threshold.

* * * * *